(12) United States Patent
Jung et al.

(10) Patent No.: US 12,244,917 B2
(45) Date of Patent: Mar. 4, 2025

(54) CAMERA APPARATUS AND ELECTRONIC DEVICE INCLUDING THE SAME

(71) Applicant: LG ELECTRONICS INC., Seoul (KR)

(72) Inventors: Yungwoo Jung, Seoul (KR); Yunsup Shin, Seoul (KR); Changhwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 166 days.

(21) Appl. No.: 18/007,993

(22) PCT Filed: Jun. 4, 2020

(86) PCT No.: PCT/KR2020/007292
§ 371 (c)(1),
(2) Date: Dec. 2, 2022

(87) PCT Pub. No.: WO2021/246555
PCT Pub. Date: Dec. 9, 2021

(65) Prior Publication Data
US 2023/0262311 A1 Aug. 17, 2023

(51) Int. Cl.
*H04N 23/56* (2023.01)
*G02B 3/12* (2006.01)
*G06V 10/141* (2022.01)
*H04N 13/254* (2018.01)
*H04N 23/54* (2023.01)
*H04N 23/55* (2023.01)

(52) U.S. Cl.
CPC ............... *H04N 23/56* (2023.01); *G02B 3/12* (2013.01); *G06V 10/141* (2022.01); *H04N 13/254* (2018.05); *H04N 23/54* (2023.01); *H04N 23/55* (2023.01)

(58) Field of Classification Search
CPC .......... G02B 3/12; G02B 3/14; G02B 13/004; H04N 23/55; H04N 23/54; H04N 23/56; H04N 13/254; H04N 13/239; H04N 5/2226; H04N 2013/0081; G03B 15/05; G03B 2215/0592; G06V 10/141
USPC ......................................................... 348/370
See application file for complete search history.

(56) References Cited

U.S. PATENT DOCUMENTS

| 9,869,922 | B2 |   | 1/2018 | Cho |            |
|-----------|----|---|--------|-------|------------|
| 9,942,453 | B2 | * | 4/2018 | Shin  | H04N 13/204 |
| 10,368,002| B2 | * | 7/2019 | Kunick | H04N 23/55 |

(Continued)

FOREIGN PATENT DOCUMENTS

| EP | 2 157 455 A1 | 2/2010 |
| KR | 10-2015-0137788 A | 12/2015 |

(Continued)

*Primary Examiner* — Pritham D Prabhakher
(74) *Attorney, Agent, or Firm* — Birch, Stewart, Kolasch & Birch, LLP

(57) ABSTRACT

A camera apparatus and an electronic device including the same are disclosed. The camera apparatus according to the present disclosure includes: a light source; a lens module configured to output light from the light source to the outside; an actuator configured to move the light source or the lens module; and an image sensor configured to convert external light into an electrical signal. Accordingly, it is possible to implement a high-quality 3D volume by dynamically moving output light.

17 Claims, 37 Drawing Sheets

(56) References Cited

U.S. PATENT DOCUMENTS

| | | | | |
|---|---|---|---|---|
| 10,609,359 B2* | 3/2020 | Horesh | ................ | H04N 5/2226 |
| 10,880,482 B2* | 12/2020 | Kunick | .................... | G02B 7/08 |
| 11,132,804 B2* | 9/2021 | Chan | .................. | G01B 11/2513 |
| 2016/0109232 A1* | 4/2016 | Shin | ..................... | H04N 13/204 |
| | | | | 348/140 |
| 2017/0374352 A1* | 12/2017 | Horesh | ................ | H04N 13/254 |
| 2019/0158749 A1* | 5/2019 | Kunick | ................. | H04N 23/67 |
| 2019/0200002 A1* | 6/2019 | Liu | ........................ | H04N 23/11 |
| 2019/0366430 A1* | 12/2019 | Yeh | ......................... | B22F 3/225 |

FOREIGN PATENT DOCUMENTS

| | | |
|---|---|---|
| KR | 10-2020-0003762 A | 1/2020 |
| KR | 10-2020-0053958 A | 5/2020 |
| KR | 10-2117561 B1 | 6/2020 |
| WO | WO 2019/106033 A1 | 6/2019 |
| WO | WO 2020/085873 A1 | 4/2020 |

\* cited by examiner

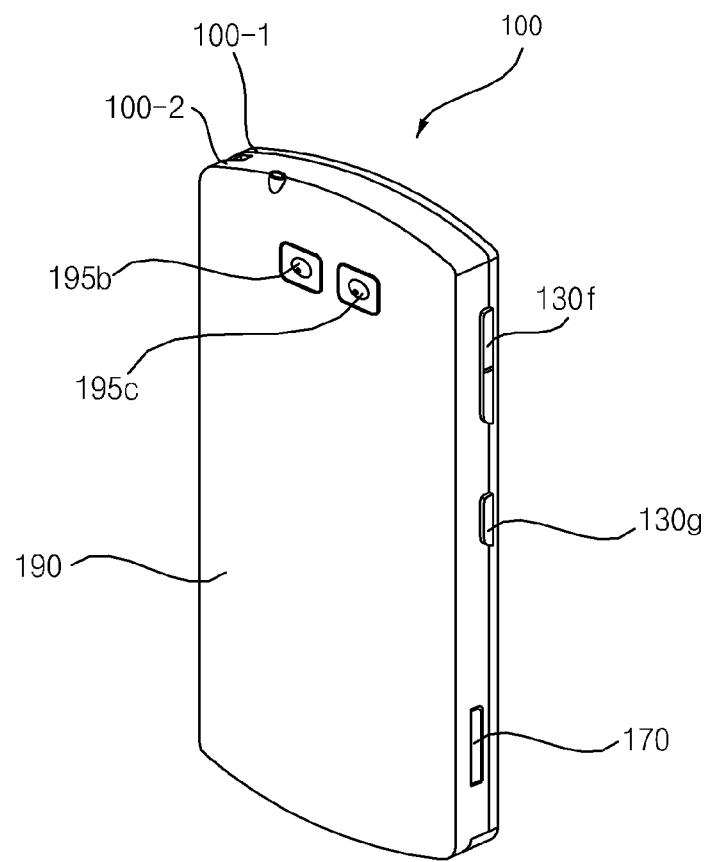

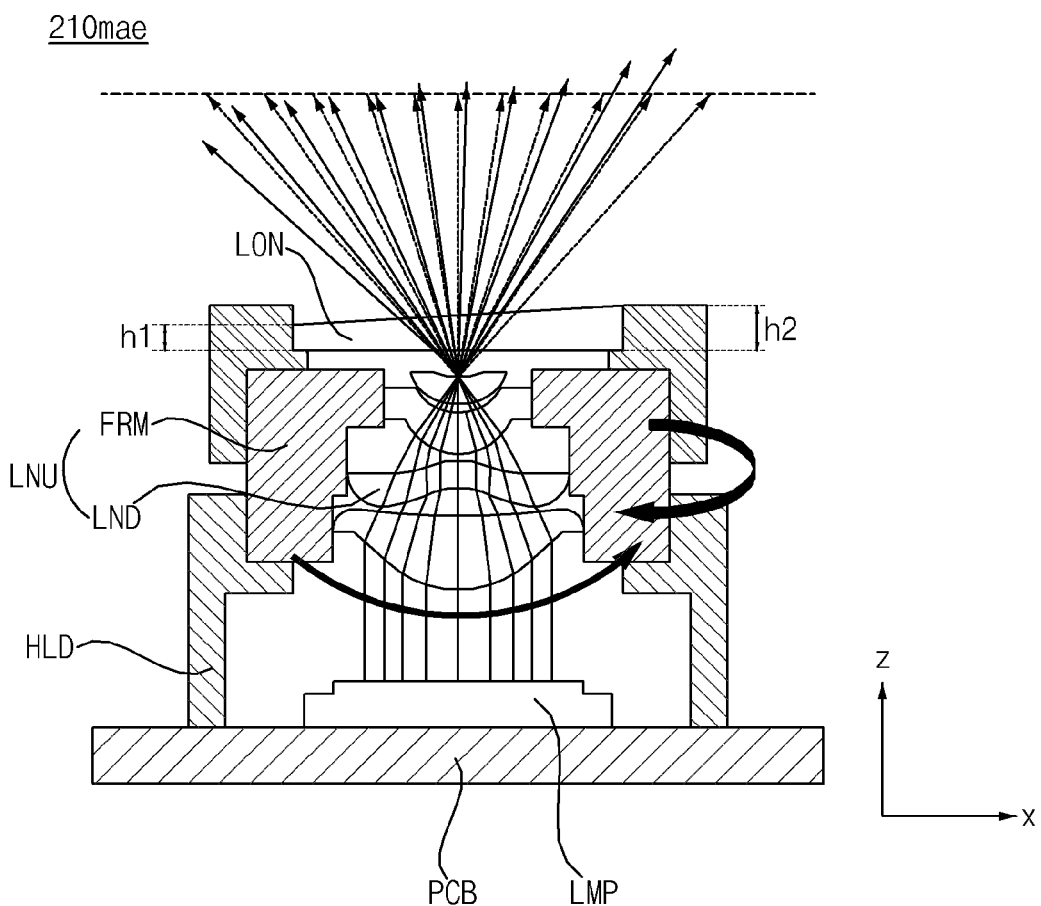

(a)

(b)

(a)

(b)

CAMERA APPARATUS AND ELECTRONIC DEVICE INCLUDING THE SAME

CROSS REFERENCE TO RELATED APPLICATIONS

This application is the National Phase of PCT International Application No. PCT/KR2020/007292, filed on Jun. 4, 2020, which is hereby expressly incorporated by reference into the present application.

BACKGROUND

1. Field

The present disclosure relates to a camera apparatus, and an electronic device including the same, and more particularly, to a camera apparatus capable of implementing a high-quality 3D volume by dynamically moving output light, and an electronic device including the same.

2. Description of the Related Art

A depth camera is an apparatus for 3D space recognition. Each camera apparatus achieves depth in a different way, and therefore each camera apparatus has its own distinct advantages and disadvantages.

However, they share the same goal of recognizing a 3D space, aiming at the realization of 3-dimensional space recognition, especially in the field of 3D construction, and utilizes temporally accumulated distance information.

Meanwhile, a 3D depth camera generally produces sensor results by using auxiliary light. Such auxiliary light applies to structured light, active stereo, and TOF, with the differences in how the auxiliary light affects computational accuracy, and is essentially used to obtain high-quality depth information.

A 3D reconstruction algorithm aims to implement one space volume by incorporating temporally continuous incoming 3D depth information.

However, in 3D reconstruction, an artifact of auxiliary light affects final volume when the auxiliary light is continuously cast onto a surface in the same space under the same conditions.

That is, the 3D reconstruction algorithm produces a result by incorporating multiple depths in time. If the artifact of the auxiliary light is continuously located in the same 3D volume in multiple successive depth frames, a corresponding error affects the result of the 3D volume.

SUMMARY

The present disclosure has been made in view of the above problems, and provides a camera apparatus capable of implementing a high-quality 3D volume by dynamically moving output light, and an electronic device including the same.

The present disclosure further provides a camera apparatus capable of reducing artifacts caused by a light source, and an electronic device including the same.

In accordance with an aspect of the present disclosure, a camera apparatus may include: a light source; a lens module configured to output light from the light source to the outside; an actuator configured to move the light source or the lens module; and an image sensor configured to convert external light into an electrical signal.

The lens module may include: a plurality of lenses positioned above the light source; and a frame configured to support the plurality of lenses, wherein the actuator includes a coil attached to the frame and a magnet spaced apart from the coil.

The actuator may be disposed on a side surface of the frame and change the output direction of light from the light source by performing horizontal rotation or vertical rotation of the lens module.

The lens module may include: a plurality of lenses positioned above the light source; and a frame configured to support the plurality of lenses, wherein the actuator includes a liquid lens disposed on or above the plurality of lenses.

The actuator may change the output direction of light from the light source by varying the curvature of the liquid lens.

The actuator may move the light source or the lens module for changing the direction of travel of the output light based on a movement pattern.

The camera apparatus may further include a second lens module configured to collect light from the outside and delivering the collected light to the image sensor.

The camera apparatus may further include a third lens module spaced apart from the second lens module, for collecting light from the outside and delivering the same to the image sensor.

The actuator may move the light source and the image sensor.

The actuator may change the direction of travel of light output from the lens module and the direction of travel of light input into the image sensor.

The actuator may include a liquid lens disposed on or above the lens module and above the image sensor.

The camera apparatus may further include a second lens module configured to collect light from the outside and delivering the collected light to the image sensor.

The light source may output structured light.

The light source may output infrared light.

The camera apparatus may further include a processor configured to control the actuator, wherein, in the first mode, the processor controls the actuator to operate at a higher frequency than a frame frequency of an image obtained by the image sensor.

The camera apparatus may further include a processor configured to control the actuator, wherein the processor receives motion information from an external inertial sensor, and controls the actuator to operate based on the level of the motion information being lower than a reference value and controls the actuator to not operate based on the level of the motion information being higher than or equal to the reference value.

The processor may generate a 3D image based on a plurality of image frames obtained by conversion by the image sensor, based on light of output direction changed by the actuator.

In accordance with another aspect of the present disclosure, a camera apparatus may include: a light source; a lens module configured to output light from the light source to the outside; a second lens module configured to collect light from the outside; an image sensor configured to convert light coming from the second lens module into an electrical signal; and an actuator configured to move the direction of travel of light output from the lens module and the direction of travel of light input into the second lens module.

The actuator may include a liquid lens disposed on or above the lens module and the second lens module.

The camera apparatus may further include a processor configured to control the actuator, wherein, in the first mode, the processor controls the actuator to operate at a higher frequency than a frame frequency of an image obtained by the image sensor.

The camera apparatus may further include a processor configured to control the actuator, wherein the processor receives motion information from an external inertial sensor, and controls the actuator to operate based on the level of the motion information being lower than a reference value and controls the actuator to not operate based on the level of the motion information being higher than or equal to the reference value.

The processor may generate a 3D image based on a plurality of image frames obtained by conversion by the image sensor, based on light of output direction changed by the actuator.

EFFECTS OF THE DISCLOSURE

A camera apparatus and an electronic device including the same according to an embodiment of the present disclosure may include: a light source; a lens module configured to output light from the light source to the outside; an actuator configured to move the light source or the lens module; and an image sensor configured to convert external light into an electrical signal. Accordingly, it is possible to implement a high-quality 3D volume by dynamically moving output light. In particular, artifacts caused by the light source can be reduced by dynamically moving output light by moving the light source or the lens module through the actuator.

That is, on the other hand, when a vibration driving system is applied to all or part of the camera apparatus, no artifacts of the auxiliary light are located in the same volume in successive frames.

Therefore, although an error of depth itself cannot be overcome, the camera apparatus has its own dynamic characteristics when performing 3D reconstruction, which eliminates artifacts generated by the auxiliary light from the volume of the final result, resulting in the creation of a high-quality 3D volume.

Meanwhile, the lens module may include a plurality of lenses positioned above the light source and a frame configured to support the plurality of lenses, and the actuator may include a coil attached to the frame and a magnet spaced apart from the coil. Accordingly, it is possible to implement a high-quality 3D volume by dynamically moving output light.

Meanwhile, the actuator may be disposed on a side surface of the substrate and change the output direction of light from the light source by performing horizontal rotation or vertical rotation of the substrate. Accordingly, it is possible to implement a high-quality 3D volume by dynamically moving output light.

Meanwhile, the lens module may include: a plurality of lenses positioned above the light source; and a frame configured to support the plurality of lenses, wherein the actuator includes a liquid lens disposed on or above the plurality of lenses. Accordingly, it is possible to implement a high-quality 3D volume by dynamically moving output light.

Meanwhile, the actuator may change the output direction of light from the light source by varying the curvature of the liquid lens. Accordingly, it is possible to implement a high-quality 3D volume by dynamically moving output light.

Meanwhile, the actuator may move the light source or the lens module for changing the direction of travel of the output light based on a movement pattern. Accordingly, it is possible to implement a high-quality 3D volume by dynamically moving output light.

Meanwhile, the camera apparatus and the electronic device including the same according to an embodiment of the present disclosure may further include a second lens module configured to collect light from the outside and delivering the collected light to the image sensor. Accordingly, the image sensor is able to stably output an image signal.

Meanwhile, the camera apparatus and the electronic device including the same according to an embodiment of the present disclosure may further include a third lens module spaced apart from the second lens module, for collecting light from the outside and delivering the same to the image sensor. Accordingly, the image sensor is able to stably out put a stereo image signal.

Meanwhile, the actuator may move the light source and the image sensor. Accordingly, it is possible to implement a high-quality 3D volume by dynamically moving output light.

Meanwhile, the actuator may change the direction of travel of light output from the lens module and the direction of travel of light input into the image sensor. Accordingly, it is possible to implement a high-quality 3D volume by dynamically moving output light.

Meanwhile, the actuator may include a liquid lens disposed on or above the lens module and above the image sensor. Accordingly, it is possible to implement a high-quality 3D volume by dynamically moving output light.

Meanwhile, the camera apparatus and the electronic device including the same according to an embodiment of the present disclosure may further include a second lens module configured to collect light from the outside and delivering the collected light to the image sensor. Accordingly, the image sensor is able to stably output an image signal.

Meanwhile, the camera apparatus and the electronic device including the same according to an embodiment of the present disclosure may further include a processor configured to control the actuator, wherein, in the first mode, the processor controls the actuator to operate at a higher frequency than a frame frequency of an image obtained by the image sensor. Accordingly, it is possible to implement a high-quality 3D volume by dynamically moving output light.

Meanwhile, the camera apparatus and the electronic device including the same according to an embodiment of the present disclosure may further include a processor configured to control the actuator, wherein the processor receives motion information from an external inertial sensor, and controls the actuator to operate based on the level of the motion information being lower than a reference value and controls the actuator to not operate based on the level of the motion information being higher than or equal to the reference value. Accordingly, it is possible to implement a high-quality 3D volume by dynamically moving output light.

Meanwhile, the processor may generate a 3D image based on a plurality of image frames obtained by conversion by the image sensor, based on light of output direction changed by the actuator. Accordingly, it is possible to implement a high-quality 3D volume by dynamically moving output light.

Meanwhile, a camera apparatus and an electronic device including the same according to another embodiment of the present disclosure may include: a light source; a lens module configured to output light from the light source to the outside; a second lens module configured to collect light from the outside; an image sensor configured to convert light coming from the second lens module into an electrical signal; and an actuator configured to move the direction of travel of light output from the lens module and the direction of travel of light input into the second lens module. Accordingly, it is possible to implement a high-quality 3D volume by dynamically moving output light. In particular, artifacts caused by the light source can be reduced by dynamically moving output light by moving the light source or the lens module through the actuator.

Meanwhile, the actuator may include a liquid lens disposed on or above the lens module and the second lens module.

Meanwhile, the camera apparatus and the electronic device including the same according to another embodiment of the present disclosure may further include a processor configured to control the actuator, wherein, in the first mode, the processor controls the actuator to operate at a higher frequency than a frame frequency of an image obtained by the image sensor. Accordingly, it is possible to implement a high-quality 3D volume by dynamically moving output light.

Meanwhile, the camera apparatus and the electronic device including the same according to another embodiment of the present disclosure may further include a processor configured to control the actuator, wherein the processor receives motion information from an external inertial sensor, and controls the actuator to operate based on the level of the motion information being lower than a reference value and controls the actuator to not operate based on the level of the motion information being higher than or equal to the reference value. Accordingly, it is possible to implement a high-quality 3D volume by dynamically moving output light.

Meanwhile, the processor may generate a 3D image based on a plurality of image frames obtained by conversion by the image sensor, based on light of output direction changed by the actuator. Accordingly, it is possible to implement a high-quality 3D volume by dynamically moving output light.

BRIEF DESCRIPTION OF THE DRAWINGS

FIG. 3B is a rear perspective view of the mobile terminal shown in FIG. 3A;

DETAILED DESCRIPTION OF THE PREFERRED EMBODIMENTS

Hereinafter, the present disclosure will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

An electronic device described in this specification may include a robot, a drone, a vehicle, etc. that can employ Lidar or the like for driving, and in addition, may include home appliances such as a refrigerator, a washing machine, an air conditioner, an electronic door, an automatic temperature controller, etc., for sensing users or the like.

Meanwhile, a camera described in this specification is a camera employed in Lidar or the like, and outputs light to the front.

Figure 1:
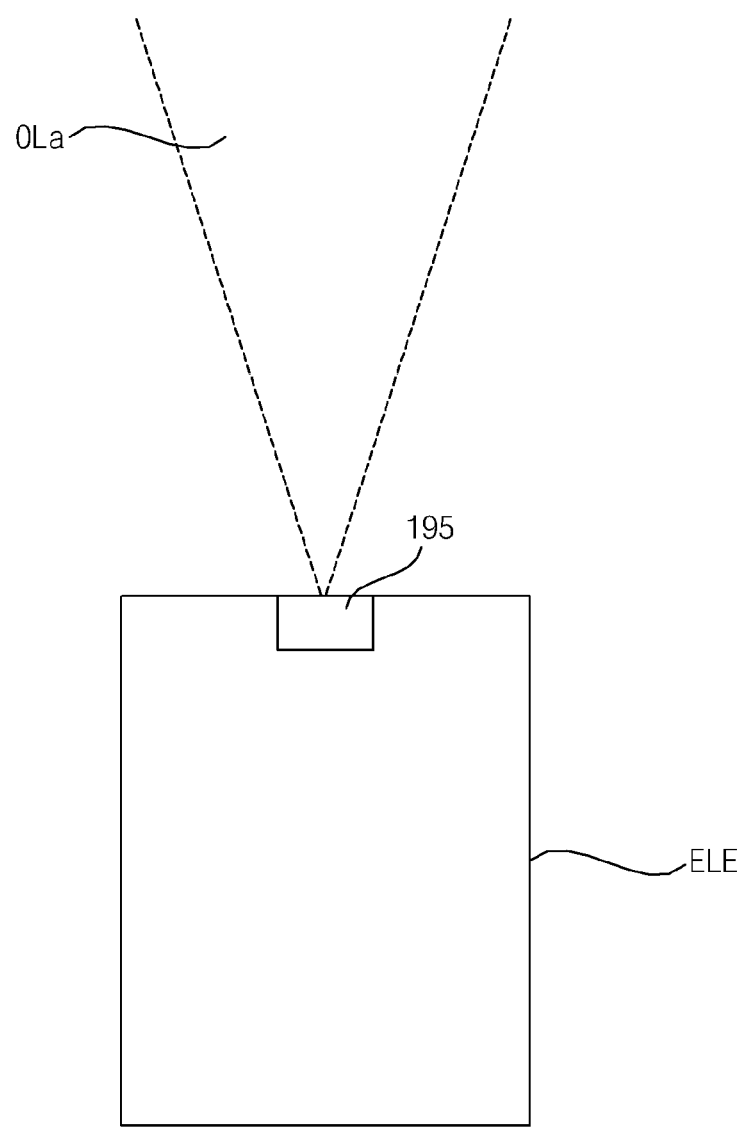
FIG. 1 is a view illustrating an electronic device including a camera apparatus according to an embodiment of the present disclosure.

FIG. 1 is a view illustrating an electronic device including a camera apparatus according to an embodiment of the present disclosure.

Referring to the drawing, the electronic device ELE may include a camera apparatus 195.

Meanwhile, the camera apparatus 195 may include a light source that outputs auxiliary light in order to obtain an image of an external object.

Meanwhile, when the light source outputs the auxiliary light, artifacts caused by the auxiliary light may be generated from the acquired image.

In particular, when the auxiliary light is outputted in a certain direction from the light source while the camera apparatus 195 is fixed or hardly moves, artifacts caused by the auxiliary light may be generated.

In particular, when the camera apparatus 195 includes a depth camera for acquiring depth information, the artifacts caused by the auxiliary light have a large effect during 3D reconstruction.

In view of this, the present disclosure proposes a method of reducing artifacts caused by a light source by dynamically moving output light by moving a light source or a lens module through an actuator.

That is, the camera apparatus 195 according to the embodiment of the present disclosure includes a light source LMP, a lens module LND for outputting light from the light source LMP to the outside, an actuator ACT for moving the light source LMP or the lens module LND, and an image sensor IMS for converting light coming from the outside into an electrical signal.

Accordingly, it is possible to implement a high-quality 3D volume by dynamically moving output light. In particular, artifacts caused by the light source LMP can be reduced by dynamically moving output light by moving the light source LMP or the lens module LND through the actuator ACT.

That is, on the other hand, when a vibration driving system is applied to all or part of the camera apparatus 195, no artifacts of the auxiliary light are located in the same volume in successive frames FRM.

Therefore, although an error of depth itself cannot be overcome, the camera apparatus 195 has its own dynamic characteristics when performing 3D reconstruction, which eliminates artifacts generated by the auxiliary light from the volume of the final result, resulting in the creation of a high-quality 3D volume.

Meanwhile, a camera apparatus 195 according to another embodiment of the present disclosure may include a light source LMP, a lens module LND for outputting light from the light source LMP to the outside, a second lens module LND for collecting light from the outside, an image sensor IMS for converting light coming from the second lens module LND into an electrical signal, and an actuator ACT for moving the direction of travel of light output from the lens module LND and the direction of travel of light input into the second lens module LND.

Accordingly, it is possible to implement a high-quality 3D volume by dynamically moving output light. In particular, artifacts caused by the light source LMP can be reduced by dynamically moving output light by moving the light source LMP or the lens module LND through the actuator ACT.

Figure 2A:
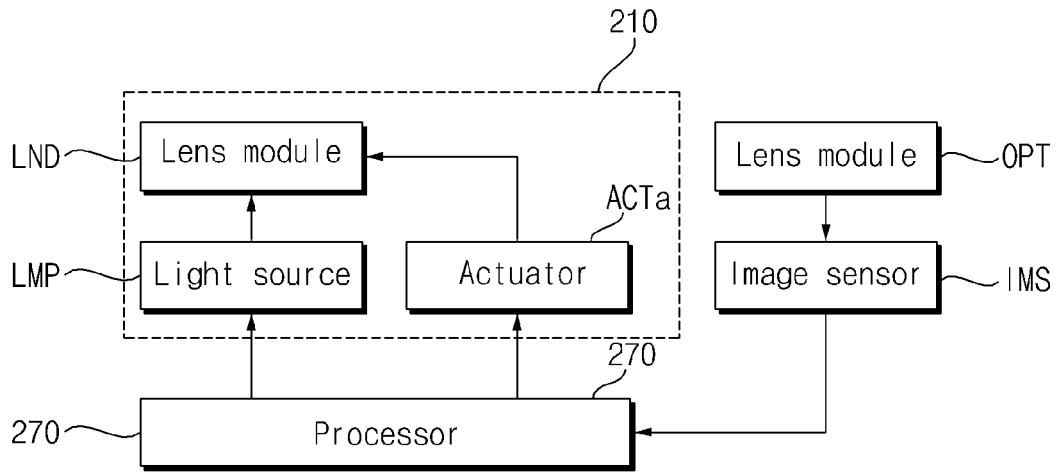
FIGS. 2A to 2C illustrate various examples of an internal block diagram of the camera apparatus of FIG. 1.
Figure 2B:
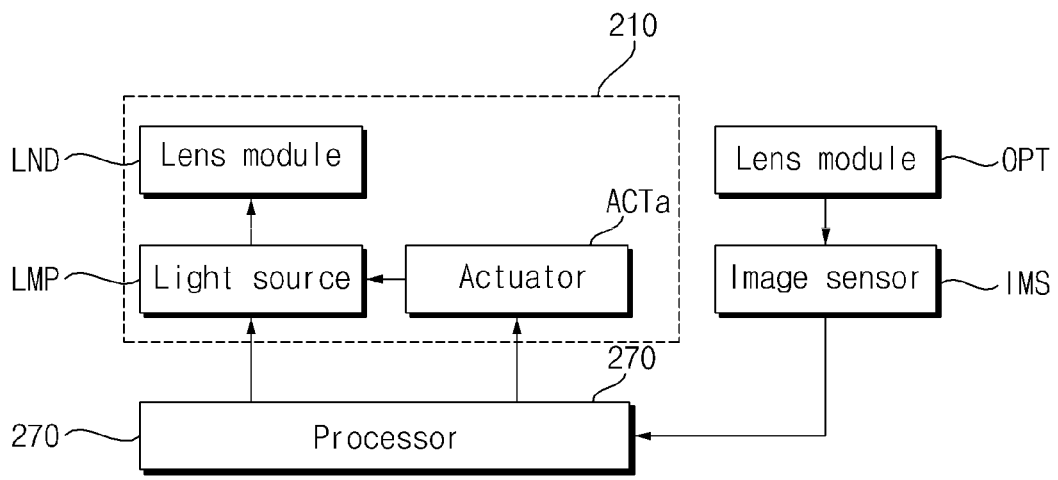
Figure 2C:
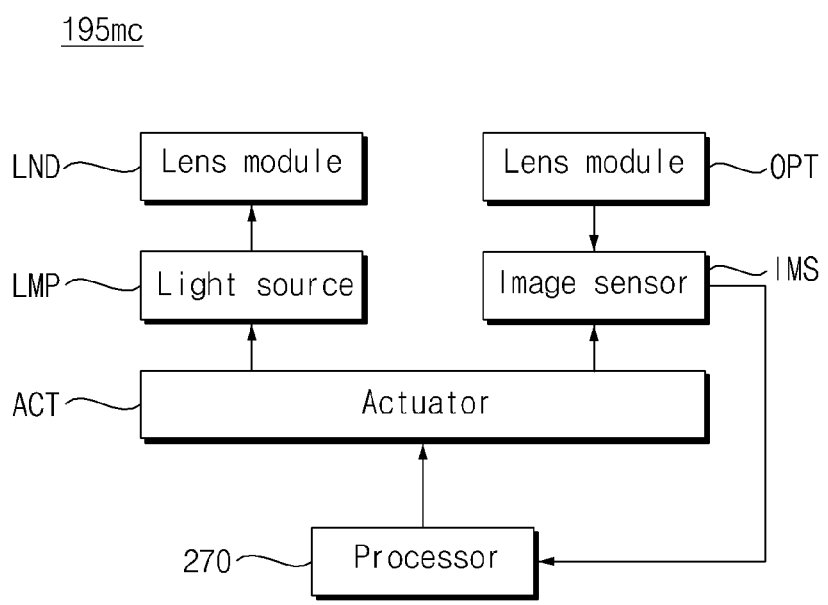

FIGS. 2A to 2C illustrate various examples of an internal block diagram of the camera apparatus of FIG. 1.

First, referring to FIG. 2A, a camera apparatus 195*ma* according to an embodiment of the present disclosure includes a light source device 210, a second lens module OPT, an image sensor IMS, and a processor 270.

The second lens module OPT may collect light from the outside and deliver it to the image sensor IMS. To this end, the second lens module OPT may include a plurality of lenses.

The image sensor IMS may convert external light coming from the second lens module OPT into an electrical signal.

To this end, the image sensor IMS may include m*n pixels and a pixel driving circuit for driving the pixels.

The electrical signal obtained by the conversion by the image sensor IMS may be sent to the processor 270, in response to an image signal.

The processor 270 may process an image signal from the image sensor IMS and output a converted image.

For example, if the image sensor IMS is an IR image sensor, the processor 270 may output a signal-processed IR image or a depth image.

As another example, if the image sensor IMS is an RGB image sensor, the processor 270 may output a signal-processed RGB image.

Meanwhile, the second lens module OPT and the image sensor IMS may operate as a depth camera.

The light source device 210 includes a light source LMP, a lens module LND for outputting light from the light source LMP to the outside, and an actuator ACTa for moving the light source LMP or the lens module LND.

The light source LMP may output structured light. Alternatively, the light source LMP may output infrared light.

The lens module LND may include a plurality of lenses positioned above the light source LMP and a frame FRM supporting the plurality of lenses.

Meanwhile, the actuator ACTa may move the light source LMP or the lens module LND for changing the direction of travel of the output light based on a movement pattern.

For example, the actuator ACTa may include a coil COL attached to the frame FRM and a magnet MGT spaced apart from the coil COL.

An attractive or repulsive force acts between the magnet MGT and the coil COL by an electrical signal applied to the coil COL, thus allowing the frame FRM to move.

That is, the actuator ACTa is disposed on a side surface of the frame FRM and changes the output direction of light from the light source LMP by performs horizontal or vertical rotation of the lens module LND.

Meanwhile, the actuator ACTa may include a magnet MGT attached to the frame FRM and a coil COL spaced apart from the magnet MGT.

As another example, the actuator ACTa may include a liquid lens LON disposed on or above the plurality of lenses.

Meanwhile, the actuator ACTa may include a liquid lens LON and a liquid lens driver (not shown) for driving the liquid lens LON.

The liquid lens LON includes a plurality of electrodes (not shown) on a first substrate (not shown), a plurality of insulators (not shown) for insulating the plurality of electrodes (not shown), a liquid (not shown) on the plurality of electrodes (not shown), an electroconductive aqueous solution (not shown) on the liquid (not shown), a common electrode (not shown) spaced apart from the liquid 530, and a second substrate (not shown) on the common electrode (not shown).

The common electrode 520 may have a hollow and may be formed in a tube shape. In addition, a liquid (not shown) and an electrically conductive aqueous solution (not shown) may be disposed in the hollow region. In this case, the liquid 530 may be a non-conductive liquid such as oil.

The liquid lens driver (not shown) may change the curvature of the formed liquid (not shown) in response to electrical signals respectively applied to the plurality of electrodes (not shown) and the common electrode (not shown).

Accordingly, the liquid lens LON may change the direction of travel of light according to the applied power.

That is, the actuator ACTa may change the output direction of light from the light source LMP by changing the curvature of the liquid lens LON.

Meanwhile, the actuator ACTa may move the lens module LND for changing the direction of travel of the output light based on the movement pattern.

Meanwhile, the processor 270 receives motion information from an external inertial sensor (not shown), and controls the actuator ACTa to operate based on the level of the motion information being lower than a reference value, and controls the actuator ACTa to not operate based on the level of the motion information being higher than or equal to the reference value.

That is, based on the level of the motion information being lower than the reference value, the processor 270 may perform a first mode in which the actuator ACTa operates, and based on the level of the motion information being higher than or equal to the reference value, it may perform a second mode in which the actuator ACTa does not operate.

Meanwhile, in the first mode, the processor 270 may control the actuator ACTa to operate at a higher frequency than a frame (FRM) frequency of an image obtained from the image sensor IMS.

Meanwhile, the processor 270 may generate a 3D image based on a plurality of image frames obtained by conversion by the image sensor IMS, based on light of output direction changed by the actuator ACTa. Accordingly, it is possible to implement a high-quality 3D volume by dynamically moving output light. In particular, it is possible to reduce artifacts caused by the light source LMP.

Next, referring to FIG. 2B, a camera apparatus 195*mb* according to another embodiment of the present disclosure may include a light source device 210, a second lens module OPT, an image sensor IMS, and a processor 270.

The camera apparatus 195*mb* of FIG. 2B is similar to the camera apparatus 195*ma* of FIG. 2A, only with the difference that the actuator ACTa moves the light source LMP but not the lens module LND.

Accordingly, the actuator ACTa may not be attached to the frame FRM of the lens module LND, but may be attached to a substrate PCB on which the light source LMP is disposed.

For example, the actuator ACTa of FIG. 2B may include a coil COL attached to the substrate PCB and a magnet MGT spaced apart from the coil COL. Accordingly, the output direction of light from the light source LMP may be changed.

As another example, the actuator ACTa may include a liquid lens LON disposed on or above the lens module LND or on top of the light source LMP. In addition, the output direction of light from the light source LMP may be changed based on the variable curvature of the liquid lens LON.

Next, referring to FIG. 2C, a camera apparatus 195mc according to another embodiment of the present disclosure includes a light source LMP, a lens module LND, a second lens module OPT, an actuator ACT, an image sensor IMS, and a processor 270.

The actuator ACT of the camera apparatus 195mc of FIG. 2C may change the direction of travel of light output from the lens module LND and the direction of travel of light input to the image sensor IMS.

For example, the actuator ACT of FIG. 2C may include a coil COL attached to the substrate PCB and a magnet MGT spaced apart from the coil COL. Accordingly, the output direction of light from the light source LMP and the direction of travel of light input into the image sensor IMS attached to the substrate PCB may be changed.

As another example, the actuator ACT may include a liquid lens LON disposed on or above the lens module LND and above the second lens module OPT. In addition, based on the variable curvature of the liquid lens LON, the direction of light output from the lens module LND and the direction of travel of light input into the second lens module OPT.

Figure 3A:
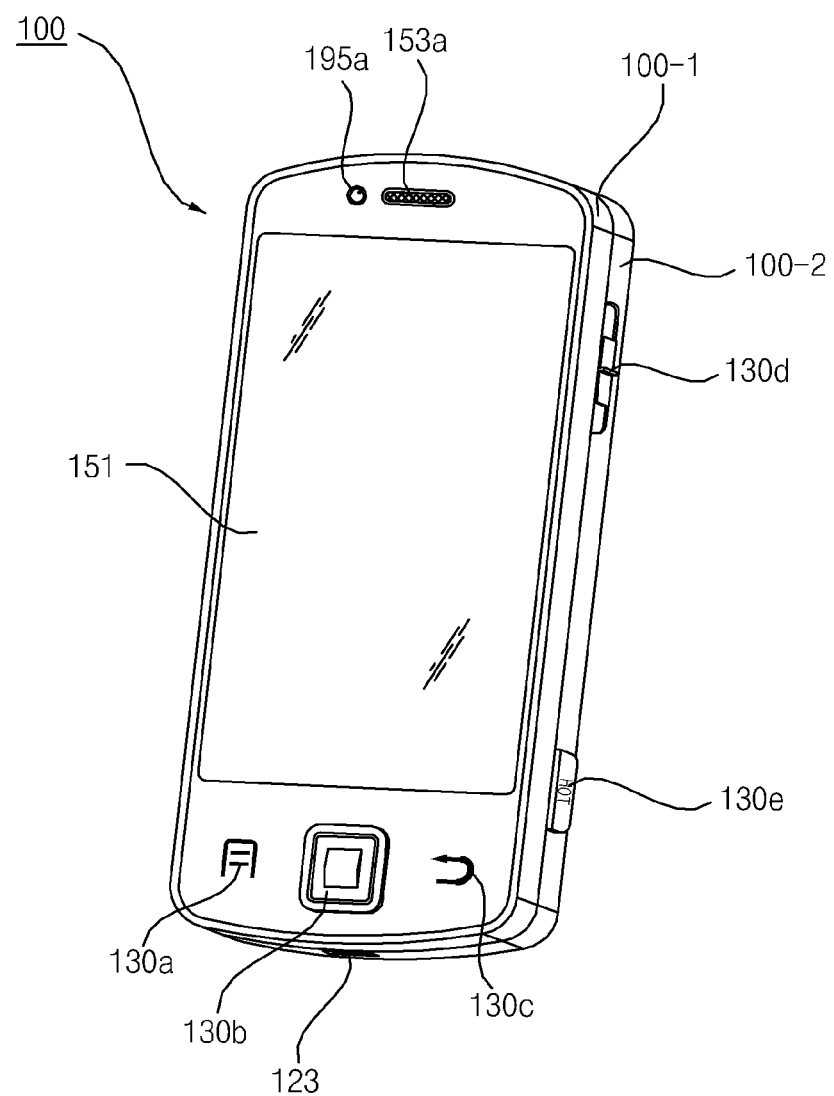
FIG. 3A is a view illustrating a mobile terminal as an example of the electronic device of FIG. 1.

FIG. 3A is a view illustrating a mobile terminal as an example of the electronic device of FIG. 1, and FIG. 3B is a rear perspective view of the mobile terminal shown in FIG. 3A.

Referring to FIG. 3A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153a, a first camera 195a, and a first to third user input devices 130a, 130b, and 130c may be disposed in the front case 100-1. Further, a fourth user input device 130d, a fifth user input device 130e, and a microphone 123 may be disposed on a lateral surface of the rear case 100-2.

In the display 180, a touchpad may be overlapped in a layer structure so that the display 180 may operate as a touch screen.

The first sound output module 153a may be implemented in the form of a receiver or a speaker. The first camera 195a may be implemented in a form suitable for photographing an image or a moving image of a user, and the like. The microphone 123 may be implemented in a form suitable for receiving a user's voice, other sounds, and the like.

The first to fifth user input devices 130a, 130b, 130c, 130d and 130e and a sixth and seventh user input devices 130f and 130g described below may be collectively referred to as a user input device 130.

The microphone 123 may be disposed in the lower side of the rear case 100-2, i.e., in the lower side of the mobile terminal 100, so as to collect an audio signal. Otherwise the microphone 123 may be disposed in the upper side of the rear case 100-2, i.e., in the upper side of the mobile terminal 100, so as to collect an audio signal.

Referring to FIG. 3B, a second camera 195b, a third camera 195c, and a fourth microphone (not shown) may be additionally mounted on the rear surface of the rear case 100-2, and a sixth and seventh user input devices 130f and 130g, and an interface 175 may be disposed on the side surface of the rear case 100-2.

The second camera 195b has a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for shooting a three-dimensional stereoscopic image.

A second sound output module (not shown) may be additionally disposed in the rear case 100-2. The second sound output module may implement a stereo function together with the first sound output module 153a, and may be used for talking in a speakerphone mode.

A power supply 190 for supplying power to the mobile terminal 100 may be mounted in the rear case 100-2. The power supply 190 may be, for example, a rechargeable battery and may be detachably coupled to the rear case 100-2 for charging or the like.

The microphone 123 may be disposed in the front surface of the rear case 100-2, i.e., in the rear surface of the mobile terminal 100 so as to collect an audio signal.

Figure 4:
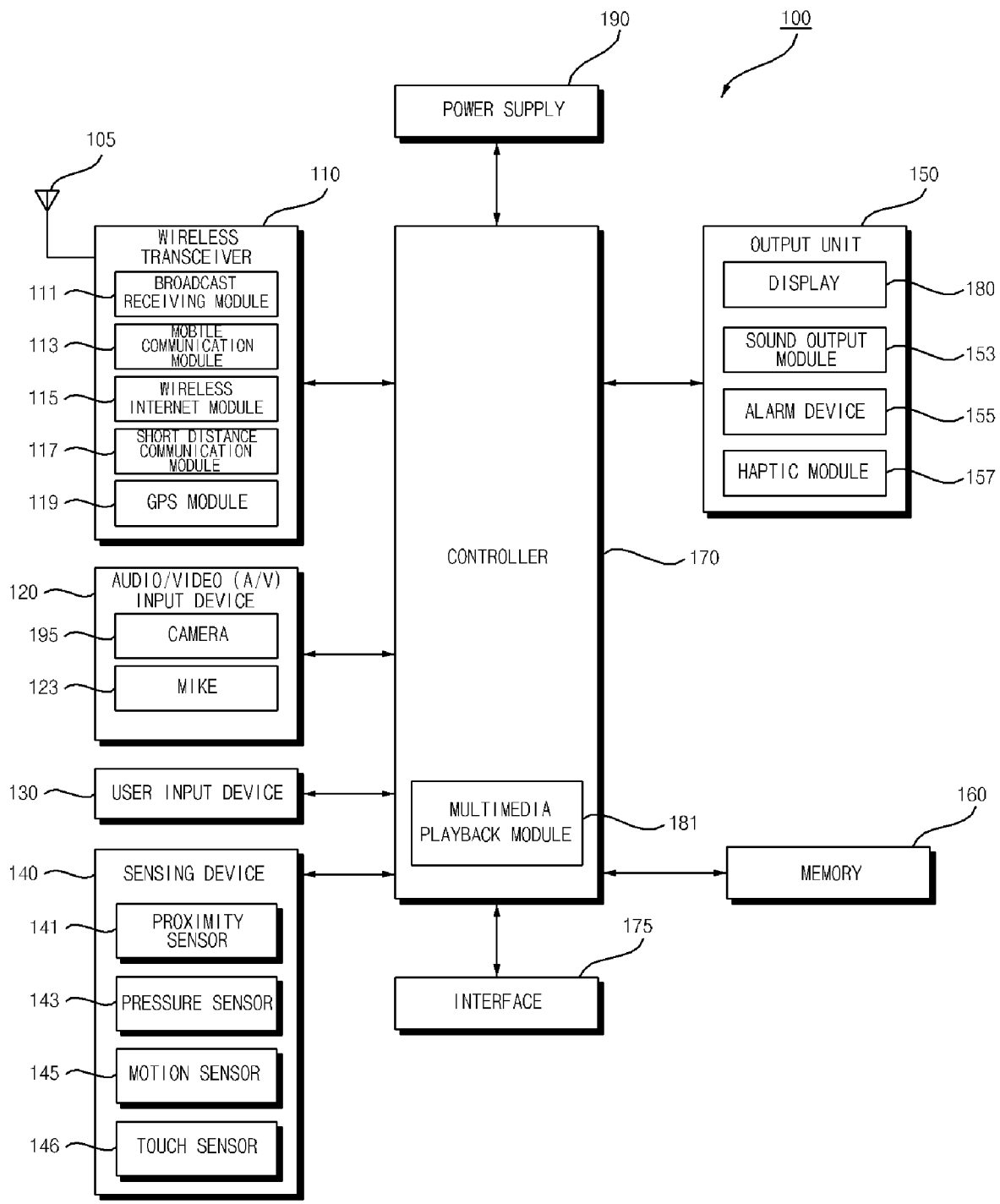
FIG. 4 is a block diagram of the mobile terminal of FIG. 3.

FIG. 4 is a block diagram of a mobile terminal of FIG. 3 according to an embodiment of the present disclosure.

Referring to FIG. 4, the mobile terminal 100 may include a wireless transceiver 110, an audio/video (A/V) input device 120, a user input device 130, a sensing device 140, an output device 150, a memory 160, an interface 175, a controller 170, and a power supply 190. When these components are implemented in an actual application, two or more components may be combined into one component if necessary, or one component may be divided into two or more components.

The wireless transceiver 110 may include a broadcast receiving module 111, a mobile communication module 113, a wireless Internet module 115, a short distance communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short distance communication module 117 refers to a module for short distance communication. BLUETOOTH, Radio Frequency Identification (RFID), infrared Data Association (IrDA), Ultra Wideband (UWB), ZigBee, and Near Field Communication (NFC) may be used as a short distance communication technology.

The Global Position System (GPS) module 119 may receive position information from a plurality of GPS satellites.

The audio/video (A/V) input device 120 may be used to input an audio signal or a video signal, and may include a camera 195, the microphone 123, and the like.

The camera 195 may process an image frame such as a still image or a moving image acquired by an image sensor in a video call mode or a photographing mode. Then, the processed image frame may be displayed on the display 180.

The image frame processed by the camera 195 may be stored in the memory 160 or transmitted to the outside through the wireless transceiver 110. Two or more cameras 195 may be provided according to the configuration of the terminal.

The microphone 123 may receive an external audio signal by a microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the controller 170, or the like.

The user input device 130 may generate key input data that the user inputs for controlling the operation of the terminal. The user input device 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing device 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing device 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for sensing position information and intensity information of the touch input. A sensing signal sensed by the touch sensor 146 may be transmitted to the controller 180.

The output device 150 may be used to output an audio signal, a video signal, or an alarm signal. The output device 150 may include a display 180, a sound output module 153, an alarm device 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless transceiver 110 or stored in the memory 160 in a call signal reception, a call mode or a recording mode, a voice recognition mode, a broadcast reception mode, and the like. In addition, the sound output module 153 may output an audio signal related to the function performed in the mobile terminal 100, e.g., a call signal reception tone, a message reception tone, and the like. The sound output module 153 may include a speaker, a buzzer, and the like.

The alarm device 155 may output a signal for notifying the occurrence of an event of the mobile terminal 100. The alarm device 155 may output a signal for notifying the occurrence of an event in a different form from an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized to be outputted or may be sequentially outputted.

The memory 160 may store a program for the processing and controlling of the controller 170, and may serve to temporarily store inputted or outputted data (e.g., a phone book, a message, a still image, a moving image, or the like).

The interface 175 may serve as an interface with all external apparatuses connected to the mobile terminal 100. The interface 175 may receive data from an external apparatus or receive power from the external apparatus to transmit to each component in the mobile terminal 100, and allow the data in the mobile terminal 100 to be transmitted to the external apparatus.

The controller 170 may control, in general, the operation of each unit to control the overall operation of the mobile terminal 100. For example, the controller 170 may perform relevant control and processing for voice call, data communication, video call, and the like. In addition, the controller 170 may include a multimedia playback module 181 for playing multimedia. The multimedia playback module 181 may be configured in hardware inside the controller 170 or may be configured in software separately from the controller 170. Meanwhile, the controller 170 may include an application processor (not shown) for driving an application. Alternatively, the application processor (not shown) may be provided separately from the controller 170.

The power supply 190 may receive external power or internal power under the control of the controller 170 to supply power required for operation of each component.

FIGS. 5A to 5D are views illustrating a camera apparatus according to various embodiments of the present disclosure. FIGS. 6A to 16C are views referenced in the description of FIGS. 5A to 5D.

Figure 5A:
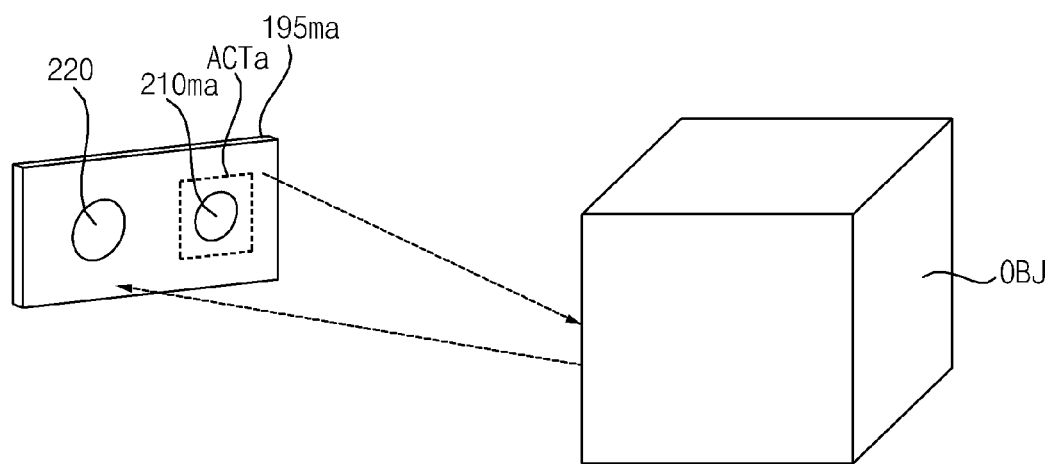
FIGS. 5A to 5D are views illustrating a camera apparatus according to various embodiments of the present disclosure.

First, FIG. 5A illustrates a camera apparatus 195*ma* according to an embodiment of the present disclosure.

Referring to the drawing, the camera apparatus 195*ma* according to an embodiment of the present disclosure may include a light source device 210*ma* for outputting light to the outside and one camera 220 for receiving external light.

As shown in FIG. 2A, the camera 220 of FIG. 5A may include a second lens module OPT and an image sensor IMS, and may further include a processor 270.

The light source device 210*ma* may output light to an external object OBJ. In particular, according to the first mode, the light source device 210*ma* may change the output light based on a specific pattern.

As shown in FIG. 2A, the light source device 210*ma* of FIG. 5A may include a light source LMP, a lens module LND for outputting light from the light source LMP to the outside, and an actuator ACTa for moving the light source LMP or the lens module LND.

For example, the actuator ACTa may include a coil COL attached to the frame FRM and a magnet MGT spaced apart from the coil COL.

Specifically, the actuator ACTa is disposed on a side surface of the frame FRM and changes the output direction of light from the light source LMP by performing horizontal rotation or vertical rotation of the lens module LND.

As another example, the actuator ACTa may include a liquid lens LON disposed on or above the plurality of lenses.

Specifically, in response to an electric signal applied to the liquid lens LON, the output direction of light from the light source LMP may be changed by changing the curvature of the liquid lens LON.

As a result, the actuator ACTa may move the light source LMP or the lens module LND for changing the direction of travel of the output light based on the movement pattern.

Figure 5B:
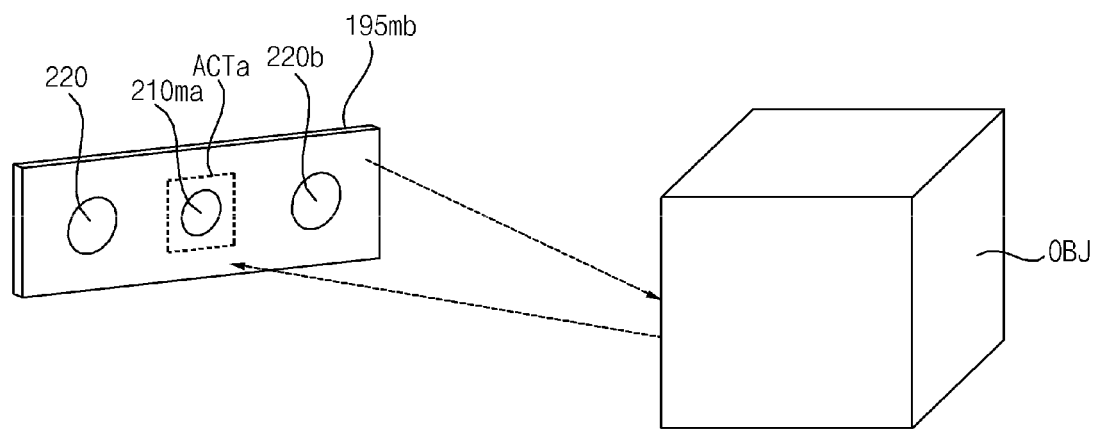

Next, FIG. 5B illustrates a camera apparatus 195*mb* according to another embodiment of the present disclosure.

Referring to the drawing, the camera apparatus 195*mb* according to another embodiment of the present disclosure may include a light source device 210*ma* for outputting light to the outside and two cameras 220 and 220*b* for receiving external light.

The light source device 210*ma* may perform the same operation as described with reference to FIG. 5A.

The first camera 220 may include a second lens module OPT and an image sensor IMS, and the second camera 220*b* may include a third lens module (not shown) spaced apart from the second lens module OPT of the first camera 220 and a second image sensor (not shown).

Meanwhile, beams of light collected through the second lens module OPT and the third lens module (not shown) may be converted into respective electrical signals through respective image sensors, and the electrical signals may be delivered to the processor 270.

Meanwhile, the first camera 220 and the second camera 220*b* may be referred to as stereo cameras.

The processor 270 may extract depth information based on electrical signals from the first camera 220 and the second camera 220*b*, that is, based on stereo image signals, and may generate a 3D image based on the extracted depth information.

In this case, as the light source device 210*ma* changes the output light based on a specific pattern, the processor 270 may create a high-quality 3D volume in which artifacts caused by the light source are removed.

Figure 5C:
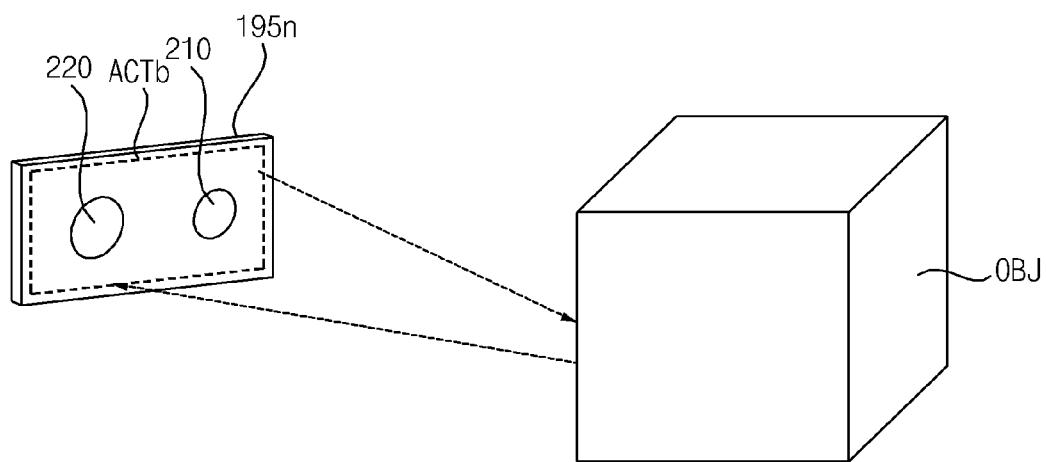

Next, FIG. 5C illustrates a camera apparatus 195*n* according to further another embodiment of the present disclosure.

Referring to the drawing, a camera apparatus 195*n* according to further another embodiment of the present disclosure may include a light source device 210*a* for outputting light to the outside and one camera 220 for receiving external light, similarly to FIG. 5A.

Next, as shown in FIG. 2C, the camera 220 of FIG. 5C may include a second lens module OPT and an image sensor IMS, and may further include a processor 270.

The light source device 210 may output light to an external object OBJ. In particular, according to the first mode, the light source device 210 may change the output light based on a specific pattern.

The light source device 210 of FIG. 5C is similar to that of FIG. 5A, only with the difference that the actuator ACTb moves the light source LMP and the substrate PCB on which the image sensor IMS is disposed.

For example, the actuator ACTb of FIG. 5C may include a coil COL attached to the substrate PCB and a magnet MGT spaced apart from the coil COL.

Specifically, the actuator ACTb may be disposed on a side surface of the substrate PCB and change the output direction of light from the light source LMP by performing horizontal rotation or vertical rotation of the substrate PCB.

As another example, the actuator ACTb may include a liquid lens LON disposed on or above the lens module LND and the second lens module OPT.

Specifically, in response to the electrical signal applied to the liquid lens LON, the output direction of light from the lens module LND and the direction of travel of light incident to the second lens module OPT may be changed by changing the curvature of the liquid lens LON.

Figure 5D:
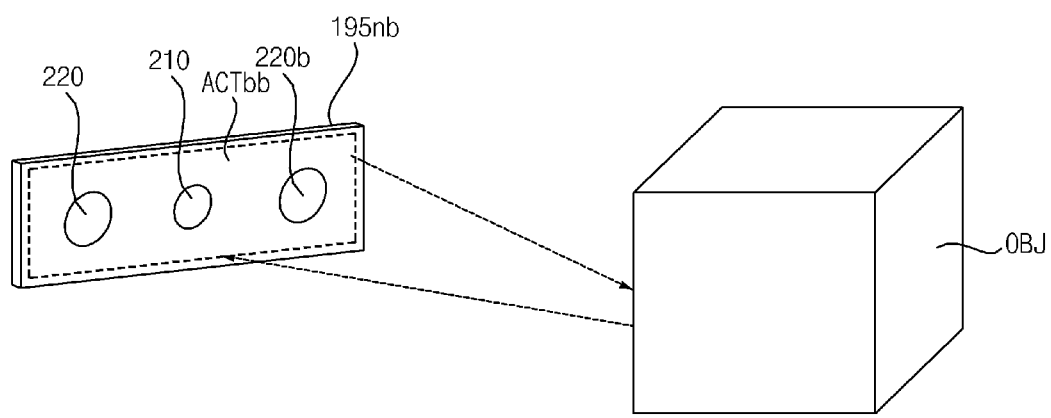

Next, FIG. 5D illustrates a camera device 195*nb* according to another embodiment of the present disclosure.

Referring to the drawing, a camera apparatus 195*nb* according to a further embodiment of the present disclosure may include a light source device 210 for outputting light to the outside and two cameras 220 and 220*b* for receiving external light.

The light source device 210 may perform a similar operation to that described with reference to FIG. 5C.

The first camera 220 may include a second lens module OPT and an image sensor IMS, and the second camera 220*b* may include a third lens module (not shown) spaced apart from the second lens module OPT of the first camera 220 and a second image sensor (not shown).

Meanwhile, beams of light collected through the second lens module OPT and the third lens module (not shown) may be converted into respective electrical signals through respective image sensors, and the electrical signals may be delivered to the processor 270.

Meanwhile, the first camera 220 and the second camera 220*b* may be referred to as stereo cameras.

The processor 270 may extract depth information based on electrical signals from the first camera 220 and the second camera 220*b*, that is, based on stereo image signals, and may generate a 3D image based on the extracted depth information.

In this case, as the light source device 210*ma* changes the output light based on a specific pattern, the processor 270 may create a high-quality 3D volume in which artifacts caused by the light source are removed.

Meanwhile, the actuator ACTb may move a substrate PCB on which the light source LMP, the image sensor IMS, and the second image sensor (not shown) are disposed.

For example, the actuator ACTb of FIG. 5D may include a coil COL attached to the substrate PCB and a magnet MGT spaced apart from the coil COL.

Specifically, the actuator ACTb may be disposed on a side surface of the substrate PCB and change the output direction of light from the light source LMP by performing horizontal rotation or vertical rotation of the substrate PCB.

As another example, the actuator ACTb may include a liquid lens LON disposed on or above the lens module LND, the second lens module OPT, and the third lens module (not shown).

Specifically, in response to an electric signal applied to the liquid lens LON, the output direction of light from the lens module LND, the direction of travel of light incident on the second lens module OPT, and the direction of travel of light incident on the third lens module (not shown) may be changed by changing the curvature of the liquid lens LON.

Figure 6A:
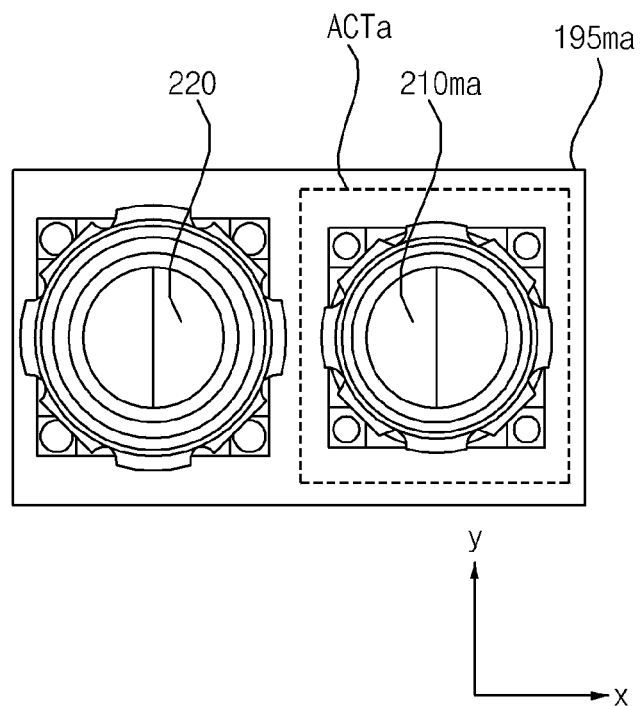
FIGS. 6A to 16C are views referenced in the description of FIGS. 5A to 5D.
Figure 6B:
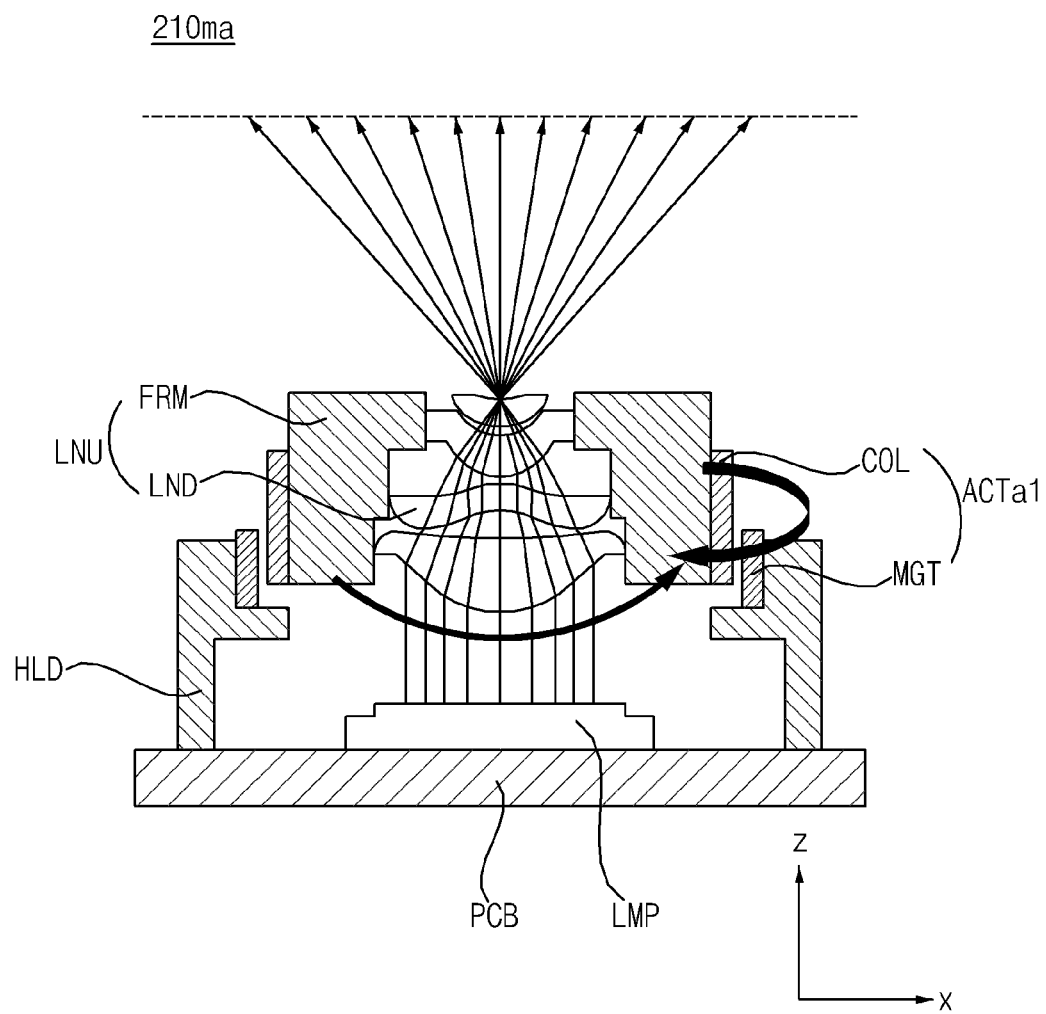

FIG. 6A is a front view of the camera apparatus 195ma of FIG. 5A, and FIG. 6B is a side view of the light source device 210ma of FIG. 6A.

Referring to the drawings, the camera apparatus 195ma may include a light source device 210ma and a camera 220.

The light source device 210ma may include a light source LMP disposed on a substrate PCB, a lens module LND for outputting light from the light source LMP to the outside, and an actuator ACTa1 for moving the light source LMP or the lens module LND.

The lens module LND is supported by a frame FRM surrounding the lens module LND.

Meanwhile, the lens module LND and the frame FRM may be collectively referred to as a lens structure LNU.

Meanwhile, the actuator ACTa1 may include a coil COL attached to the frame FRM and a magnet MGT spaced apart from the coil COL.

Meanwhile, the magnet MGT may be disposed on a holder HLD disposed under the frame FRM.

Meanwhile, the actuator ACTa1 may perform horizontal rotation or vertical rotation of the lens module LND based on an electrical signal applied to the coil COL, and, as a result, may change the output direction of light from the light source LMP by performing horizontal rotation or vertical rotation of the lens module LND.

Figure 7A:
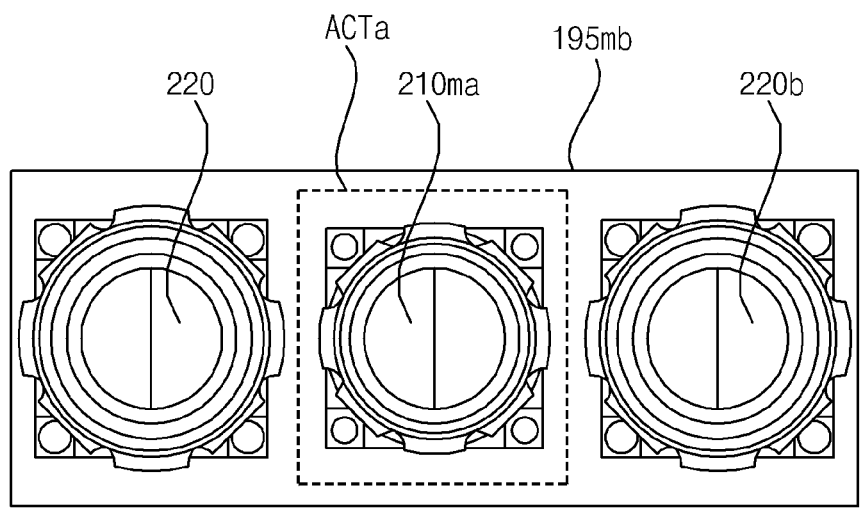
Figure 7B:
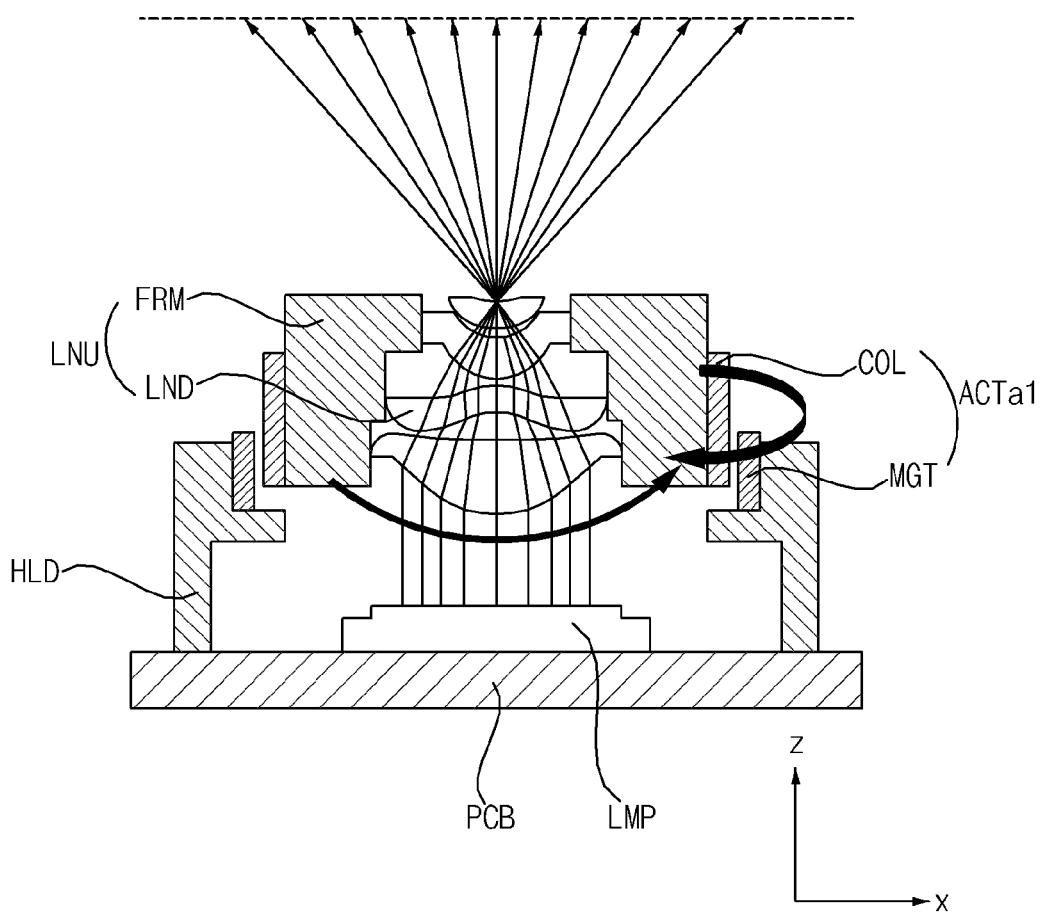

FIG. 7A is a front view of the camera apparatus 195mb of FIG. 5B, and FIG. 7B is a side view of the light source device 210ma of FIG. 7A.

Referring to the drawings, the camera apparatus 195mb may include a light source device 210ma for outputting light to the outside and two cameras 220 and 220b for receiving external light.

Meanwhile, the light source device 210ma of FIG. 7B may have the same shape as the light source 210ma of FIG. 6B.

Figure 8A:
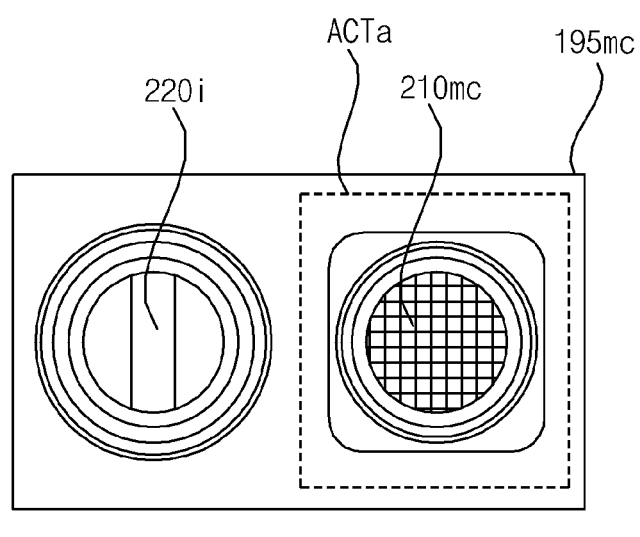
Figure 8B:
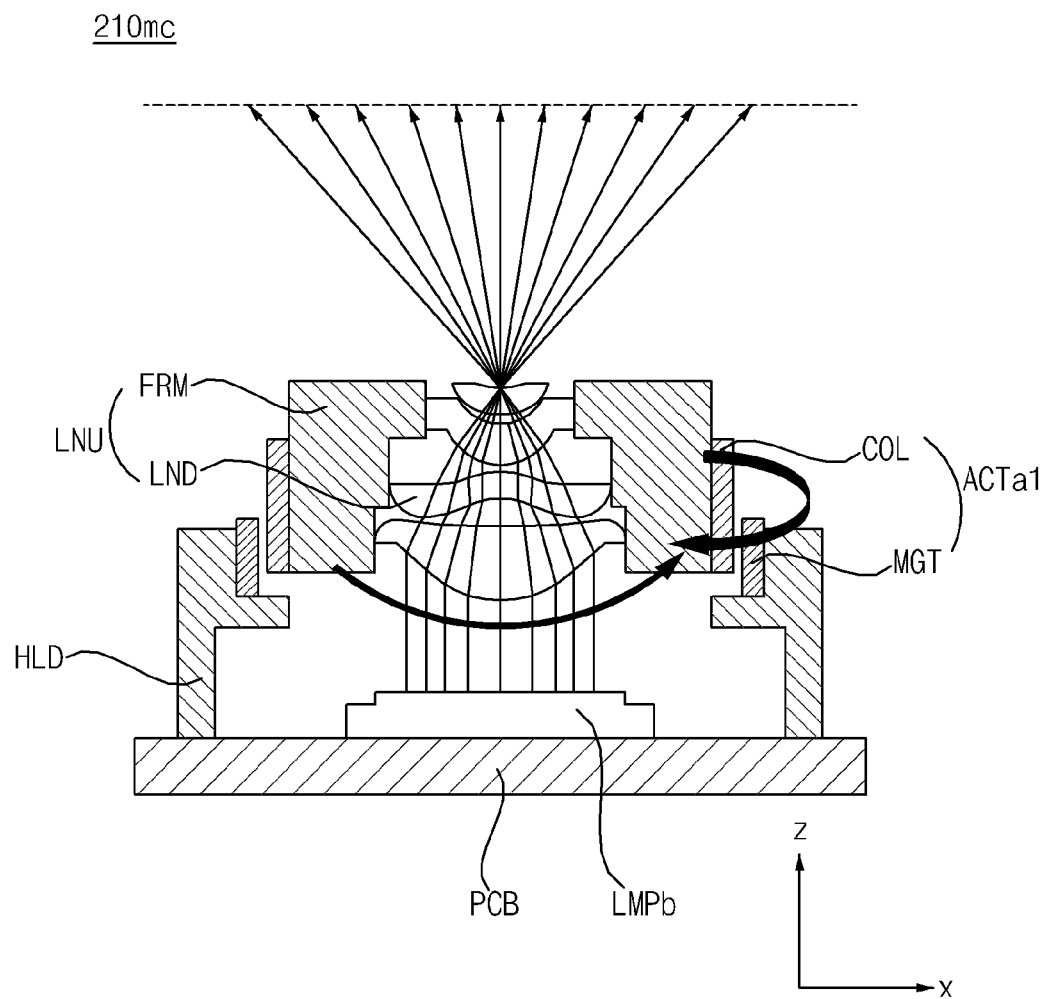

FIG. 8A is a front view of the camera apparatus 195mc according to another embodiment of the present disclosure, and FIG. 8B is a side view of the light source device 210mc of FIG. 8A.

Referring to the drawings, the camera apparatus 195mc may include a light source device 210mc for outputting light to the outside by a time-of-flight (TOF) method and a single camera 220i for receiving external light.

The light source device 210mc may include a light source LMPb for outputting light by a scanning method, a lens module LND for outputting light from the light source LMPb to the outside, and an actuator ACTa1 for moving the light source LMPb or the lens module LND.

The light source LMPB may include a MEMS scanner for scanning in one direction or a MEMS scanner for scanning in two directions.

The actuator ACTa1 may include a coil COL attached to the frame FRM and a magnet MGT spaced apart from the coil COL.

Also, based on an electric signal applied to the coil COL, the output direction of light from the light source LMPb may be changed by performing horizontal rotation or vertical rotation of the lens module LND.

Meanwhile, the camera 220i may include a second lens module OPT for collecting light from the outside and an image sensor IMS for converting light coming from the second lens module OPT into an electrical signal.

Figure 9A:
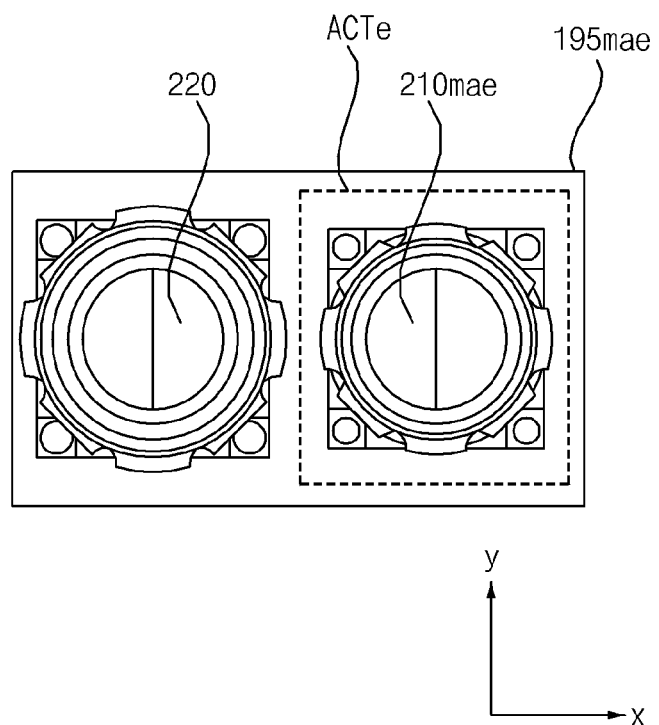
Figure 9B:
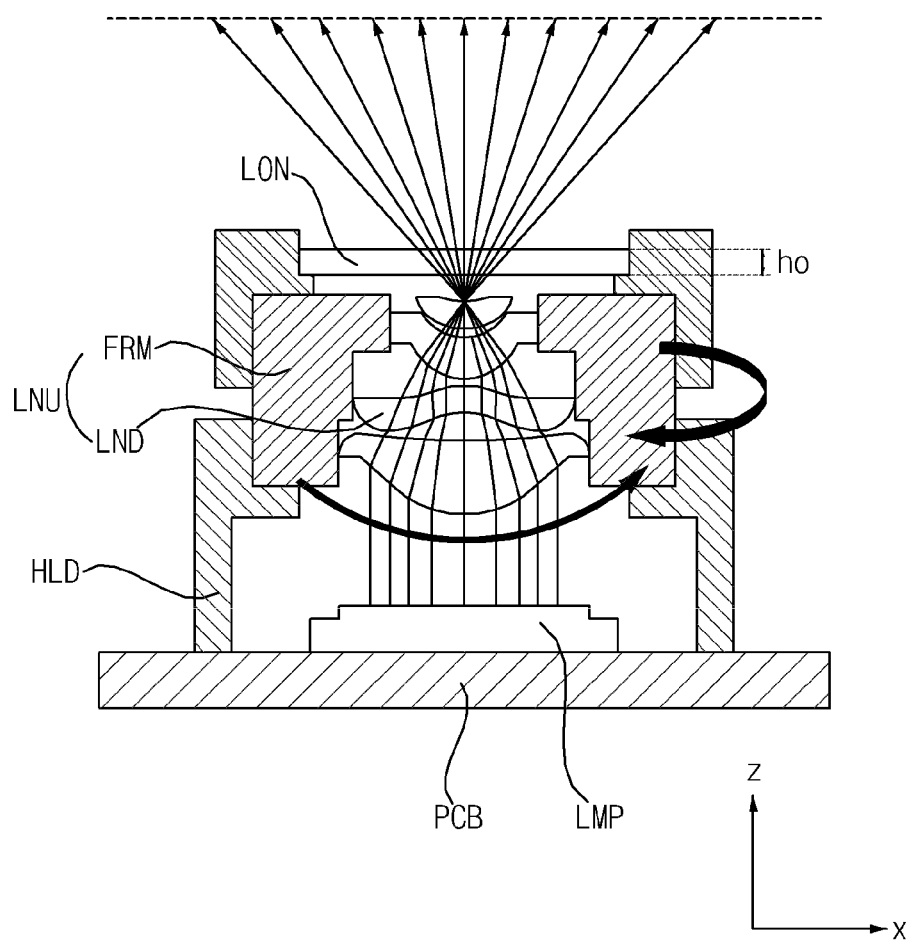

FIG. 9A, which is similar to FIG. 6A, is a front view of a camera apparatus 195mae using a liquid lens as an actuator, and FIG. 9B is a side view of a light source 210mae of FIG. 9A.

Referring to the drawings, the camera apparatus 195mae may include a light source device 210mae and a camera 220.

The light source device 210mae may include a light source LMP disposed on a substrate PCB, a lens module LND for outputting light from the light source LMP to the outside, and a liquid lens LON, as an actuator ACTe, disposed on the lens module LND.

Accordingly, unlike FIG. 6A, the frame FRM and the lens module LND do not move, and the shape or refractive index of the liquid lens LON changes in response to an electrical signal applied to the liquid lens LON.

FIG. 9B illustrates that the liquid lens LON disposed on or above the lens module LND maintains a constant thickness of ho.

FIG. 9C illustrates that, as a first electrical signal is applied to the liquid lens LON, a left side of the liquid lens LON has a thickness of h1 which is less than ho and a right side thereof has a thickness of h2 which is greater than ho.

Accordingly, in comparison to FIG. 9B, light output to the outside is moved further to the right in the direction of travel.

Figure 9D:
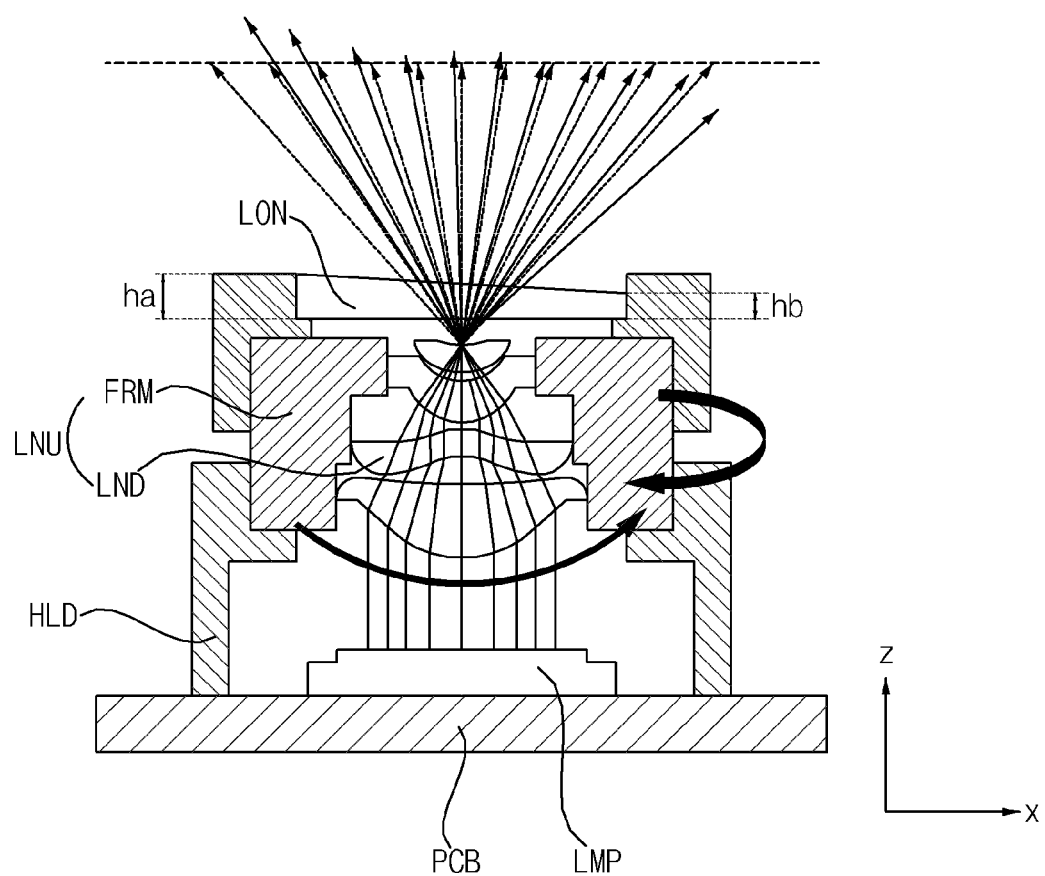

FIG. 9D illustrates that, as a second electrical signal is applied to the liquid lens LON, the left side of the liquid lens LON has a thickness of ha which is greater than ho and the right side thereof has a thickness of hb which is less than ho.

Accordingly, in comparison to FIG. 9B, light output to the outside is moved further to the left in the direction of travel.

Figure 10A:
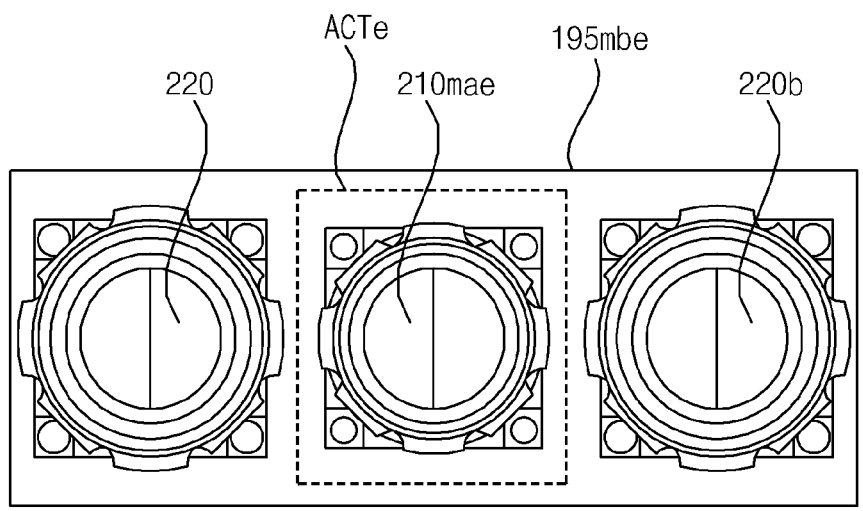
Figure 10B:
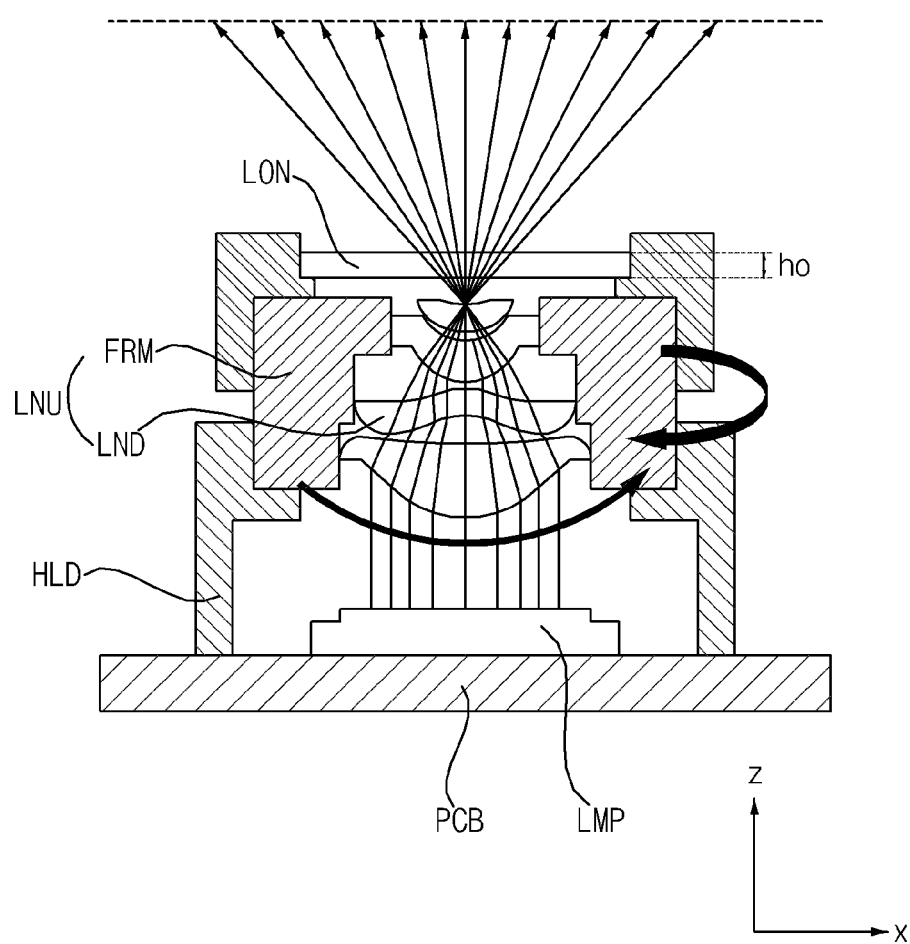
Figure 10C:
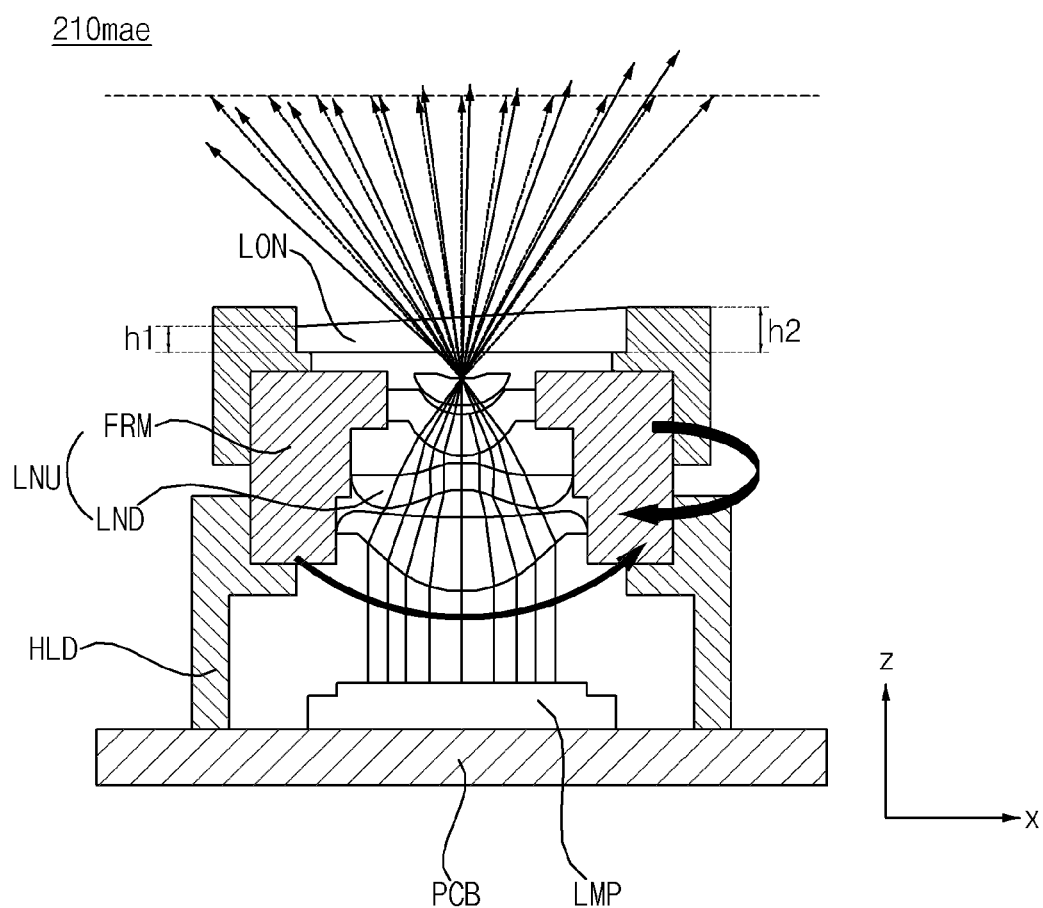

FIG. 10A, which is similar to FIG. 7A, is a front view of a camera apparatus 195mbe using a liquid lens as an actuator, and FIG. 10B is a side view of a light source device 210mae of FIG. 10A.

Referring to the drawings, the camera apparatus 195mbe may include a light source device 210mae and two cameras 220 and 220b for receiving external light.

Figure 10D:
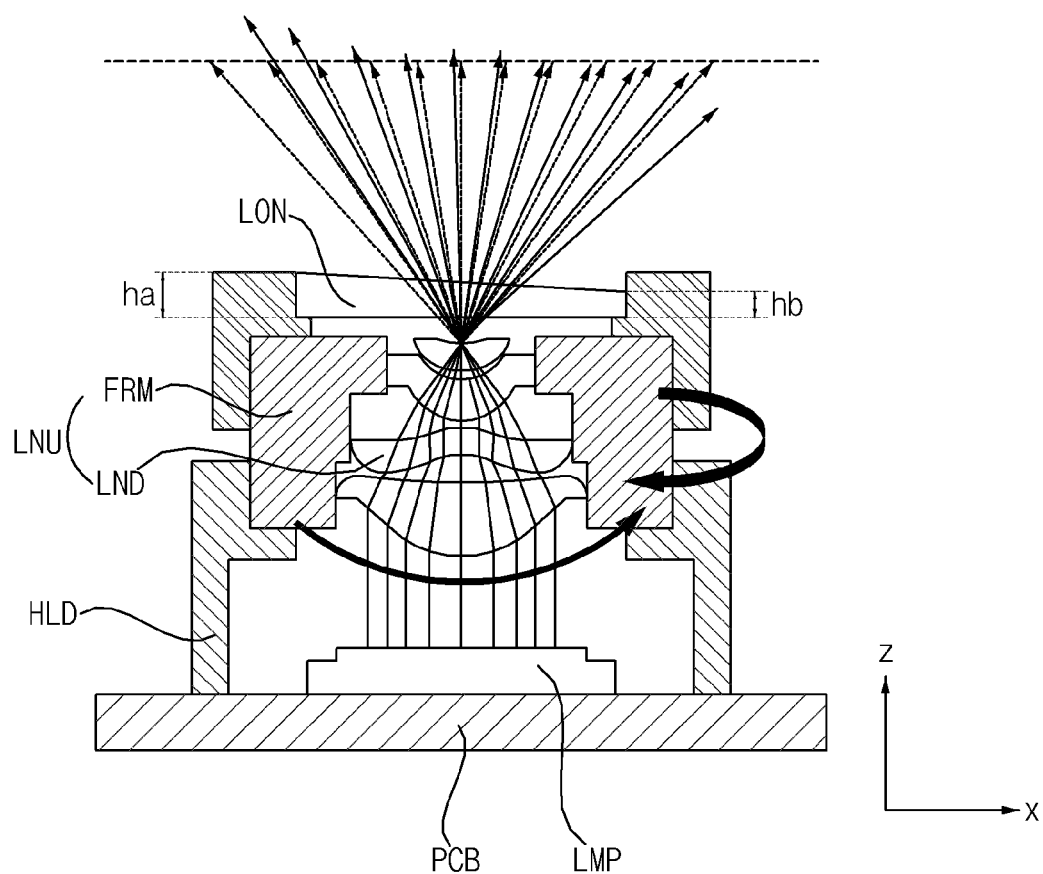

Meanwhile, the light source device 210mae of FIGS. 10D to 10D may have the same shape as the light source 210mae of FIGS. 9B to 9D. Thus, a description of them will be omitted.

Figure 11A:
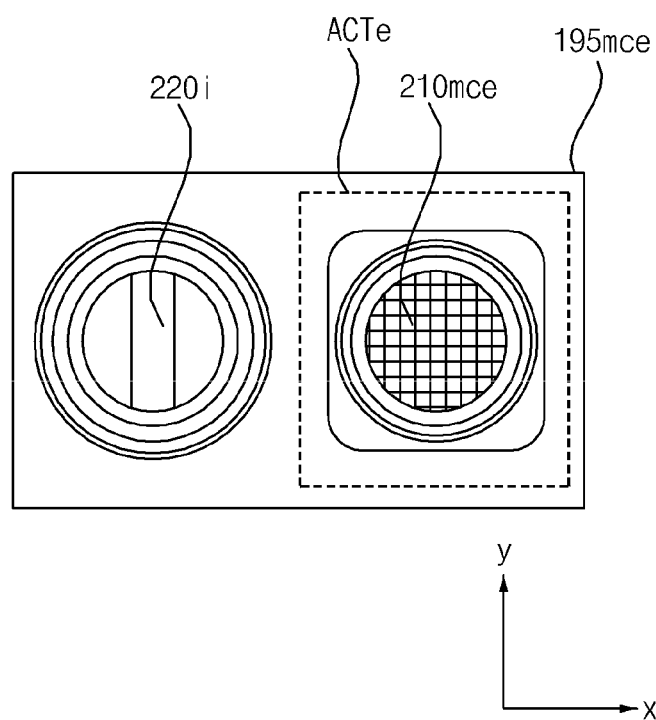

FIG. 11A, which is similar to FIG. 8A, is a front view of a camera apparatus 195mce using a liquid lens as an actuator, and FIG. 10B is a side view of a light source device 210mce of FIG. 11A.

Referring to the drawings, the camera apparatus 195mce may include a light source device 210mce for outputting light to the outside by a time-of-flight (TOF) method and a single camera 220i for receiving external light.

The light source device 210mce may include a light source LMPb for outputting light by a scanning method, a lens module LND for outputting light from the light source LMPb to the outside, and a liquid lens LON, as an actuator ACTae, disposed on or above the lens module LND.

The light source LMPb may include a MEMS scanner for scanning in one direction or a MEMS scanner for scanning in two directions.

Meanwhile, the shape or refractive index of the liquid lens LON is changed in response to an electrical signal applied to the liquid lens LON.

Figure 11B:
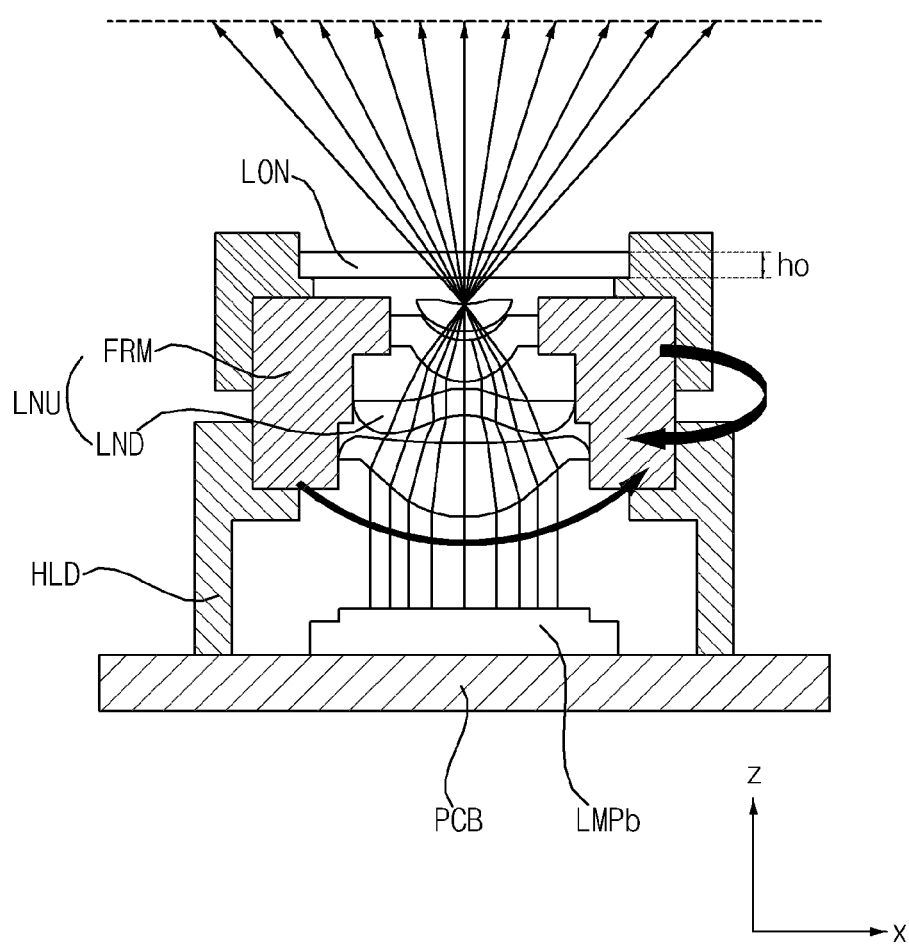

FIG. 11B illustrates that the liquid lens LON disposed on or above the lens module LND maintains a constant thickness of ho.

Figure 11C:
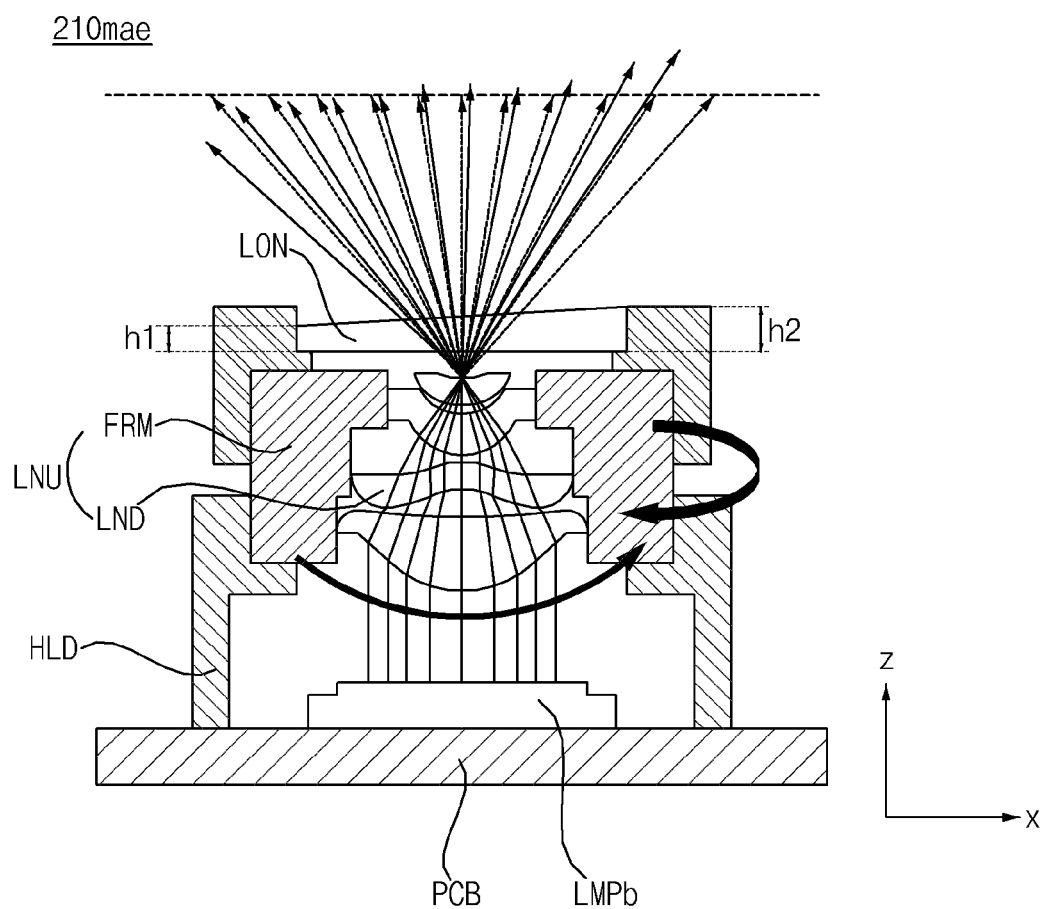

FIG. 11C illustrates that, as a first electrical signal is applied to the liquid lens LON, a left side of the liquid lens LON has a thickness of h1 which is less than ho and a right side thereof has a thickness of h2 which is greater than ho.

Accordingly, in comparison to FIG. 11B, light output to the outside is moved further to the right in the direction of travel.

Figure 11D:
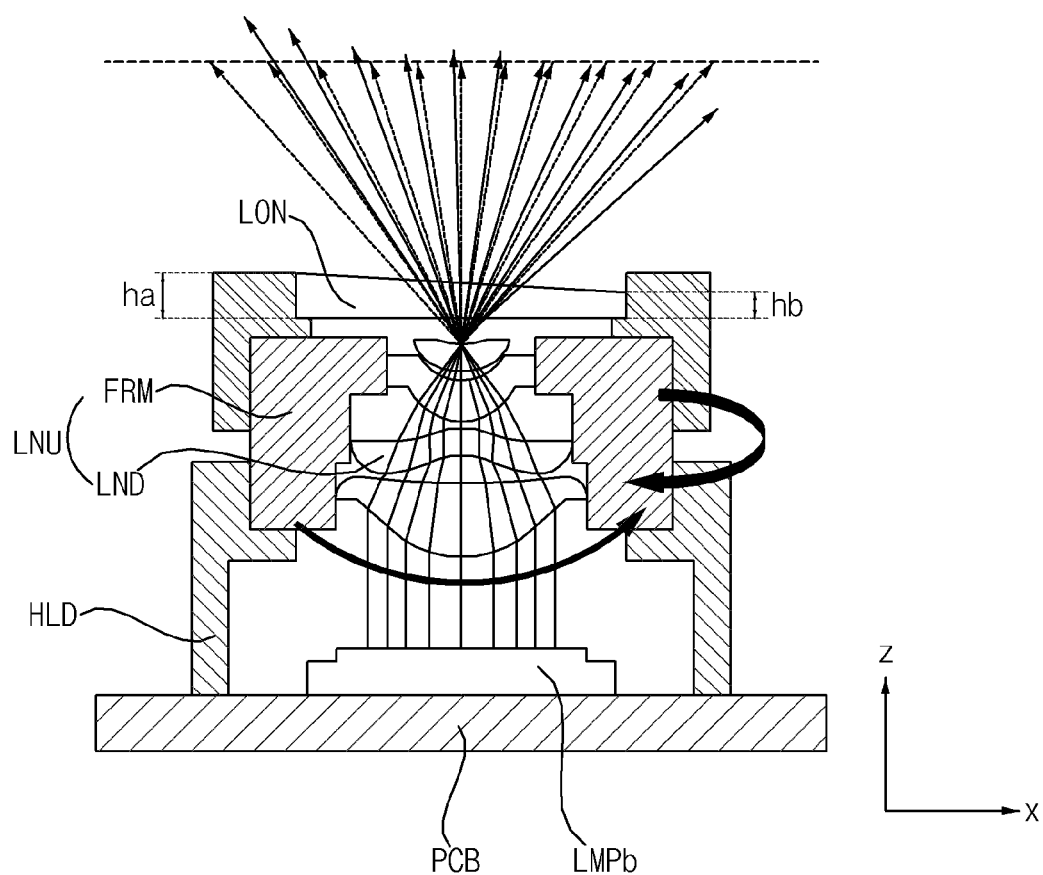

FIG. 11D illustrates that, as a second electrical signal is applied to the liquid lens LON, the left side of the liquid lens LON has a thickness of ha which is greater than ho and the right side thereof has a thickness of hb which is less than ho.

Accordingly, in comparison to FIG. 11B, light output to the outside is moved further to the left in the direction of travel.

Figure 12A:
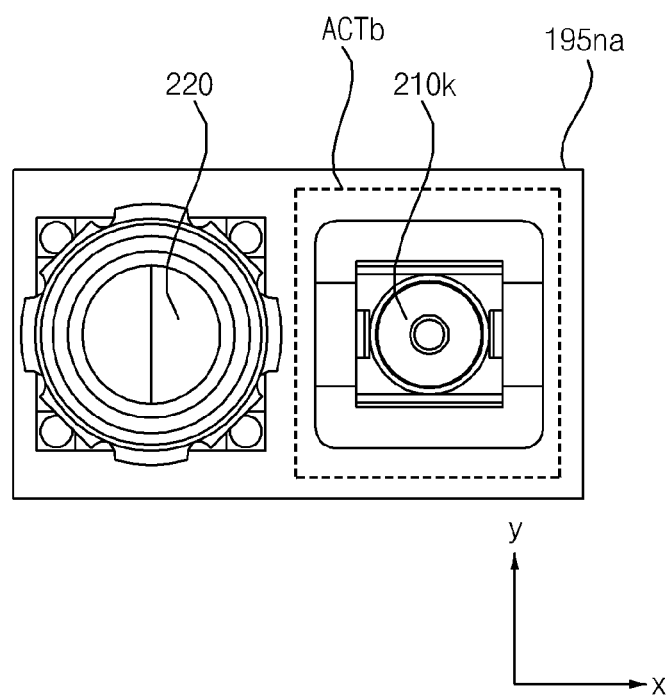
Figure 12B:
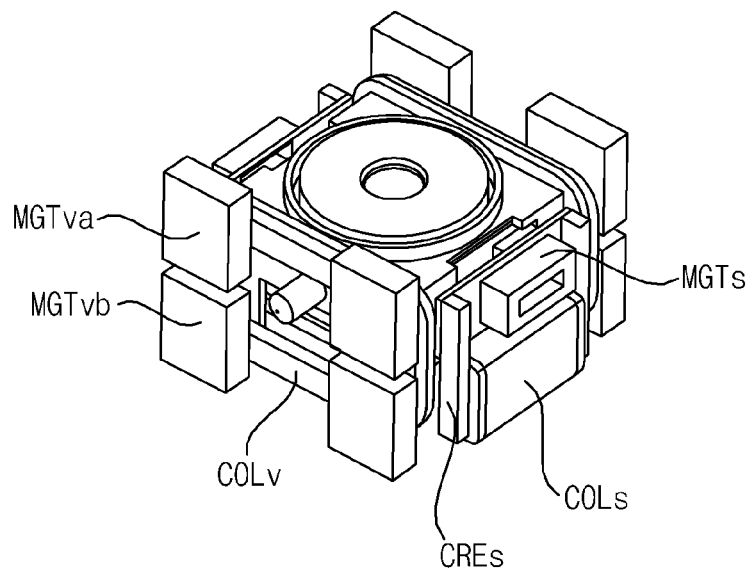

FIG. 12A is a front view of a camera apparatus 195na according to a further embodiment of the present disclosure, and FIG. 12B is a perspective view of a light source device 210k of FIG. 12A.

Referring to the drawings, the camera apparatus 195na may include a light source device 210k and a camera 220.

The light source device 210k may include a light source LMP disposed on a substrate PCB, a lens module LND for outputting light from the light source LMP to the outside, and an actuator ACTb for moving both the light source LMP and the lens module LND.

The lens module LND may be supported by a frame FRM surrounding the lens module LND, and the light source LMP may be disposed on the PCB.

Meanwhile, the actuator ACTb may include a coil COLv attached to the frame FRM, for moving the lens module LND, and magnets MGTva and MGTVb spaced apart from the coil COLv.

Meanwhile, the actuator ACTb may include a core CREs disposed on the side of the magnets MGTva and MGTVb, for moving the substrate PCB, a second coil COLs spaced apart from the core CREs and disposed on the inside of the core CREs, and a second magnet MGTs spaced apart from the second coil COLs and disposed on or above the coil COLs.

Meanwhile, the lens module LND may be moved based on an electrical signal applied to the coil COLv, and the substrate PCB may be moved based on an electrical signal applied to the second coil COLs.

Figure 13A:
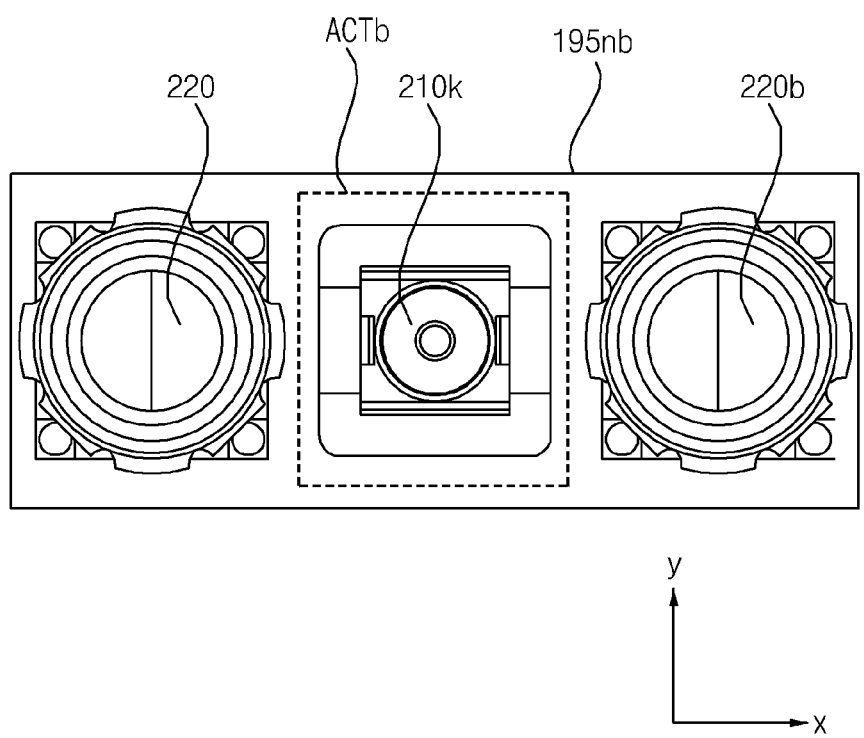

FIG. 13A is a front view of a camera apparatus 195nb according to a further embodiment of the present disclosure.

Referring to the drawing, the camera apparatus 195nb may include a light source device 210k for outputting light to the outside and two cameras 220 and 220b for receiving external light.

Meanwhile, the light source device 210k of FIG. 13A may have the same shape as the light source device 210k of FIG. 12A or 12B.

Figure 13B:
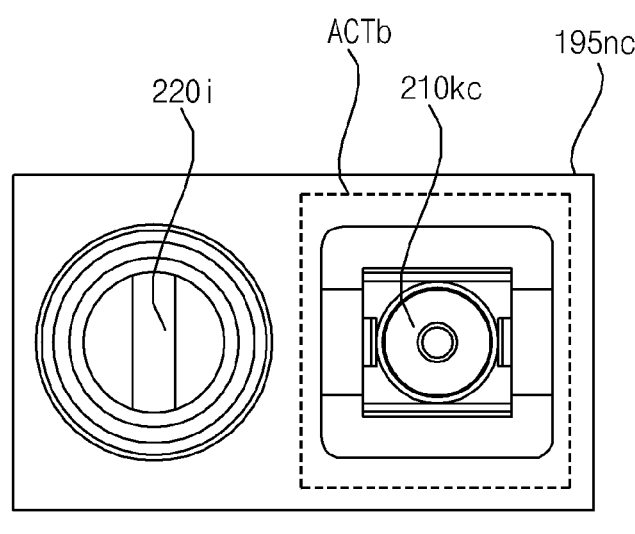

FIG. 13B is a front view of a camera apparatus 195nc according to a further embodiment of the present disclosure.

Referring to the drawings, the camera apparatus 195nc may include a light source device 210mc for outputting light to the outside by a time-of-flight (TOF) method and a single camera 220i for receiving external light.

The light source device 210k of FIG. 13B, similarly to the light source 210k of FIG. 11b, may include a light source LMPb, a lens module LND, and an actuator ACTb for moving both the light source LMPb and the lens module LND.

In this case, the light source LMPb may include a MEMS scanner for scanning in one direction or a MEMS scanner for scanning in two directions.

Figure 14A:
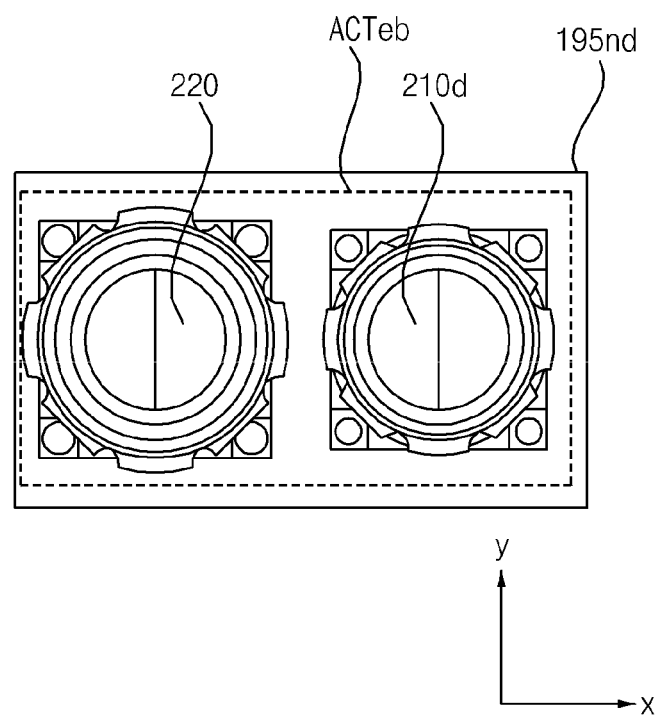
Figure 14B:
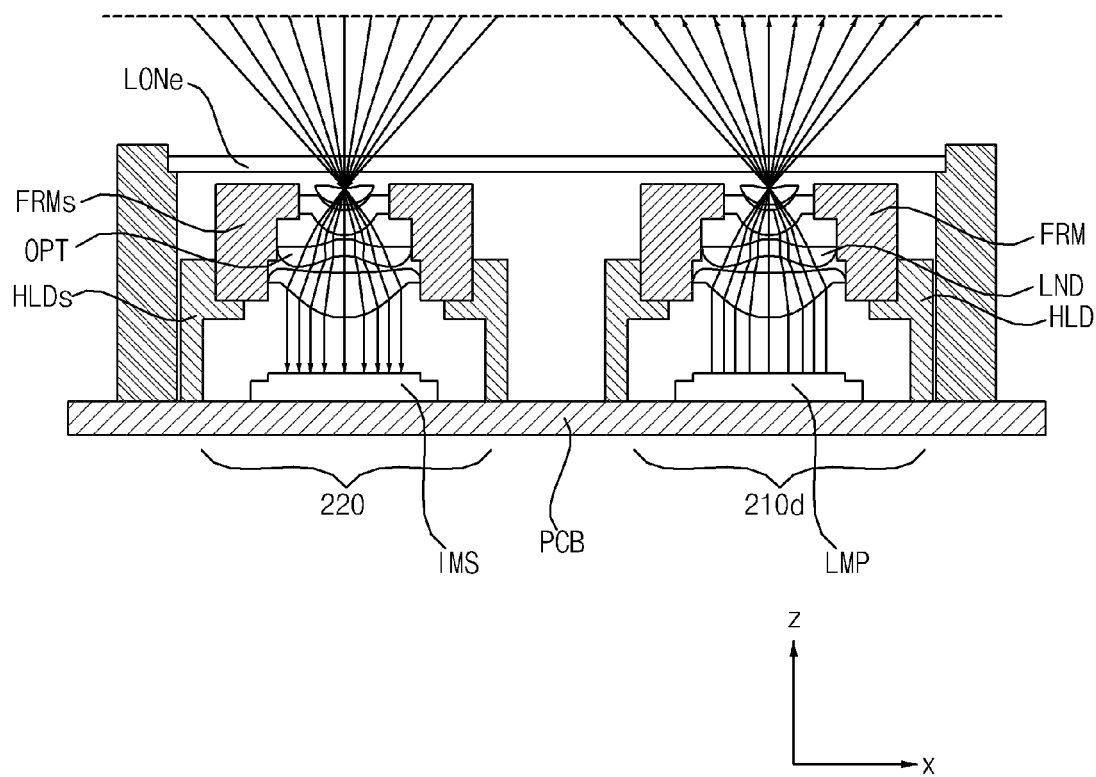

FIG. 14A is a front view of a camera apparatus 195nd according to a further embodiment of the present disclosure, and FIG. 14B is a perspective view of a light source device 210d of FIG. 14A.

Referring to the drawings, the camera apparatus 195nd may include a light source device 210d and a camera 220.

The light source device 210d may include a light source LMP disposed on a substrate PCB, a lens module LND for outputting light from the light source LMP to the outside, and a liquid lens LONe, as an actuator ACTeb, disposed on the lens module LND.

Meanwhile, the camera 220 may include an image sensor IMS disposed on a common substrate PCB, a second lens module OPT disposed on the image sensor IMS, for outputting light to the image sensor IMS, and a liquid lens LONe, as an actuator ACTeb, disposed on the second lens module OPT.

The second lens module OPT may be supported by a second frame FRMs, and the second frame FRMs may be supported by a second holder HLD.

Meanwhile, since the liquid lens LONe is disposed on or above the lens module LND in the light source device 210d and the second lens module OPT in the camera 220, which are spaced apart from each other, the direction of light output from the lens module LND and the direction of light input into the second lens module OPT may be changed by varying the refractive index based on an applied electrical signal, based on an applied electrical signal.

Figure 15A:
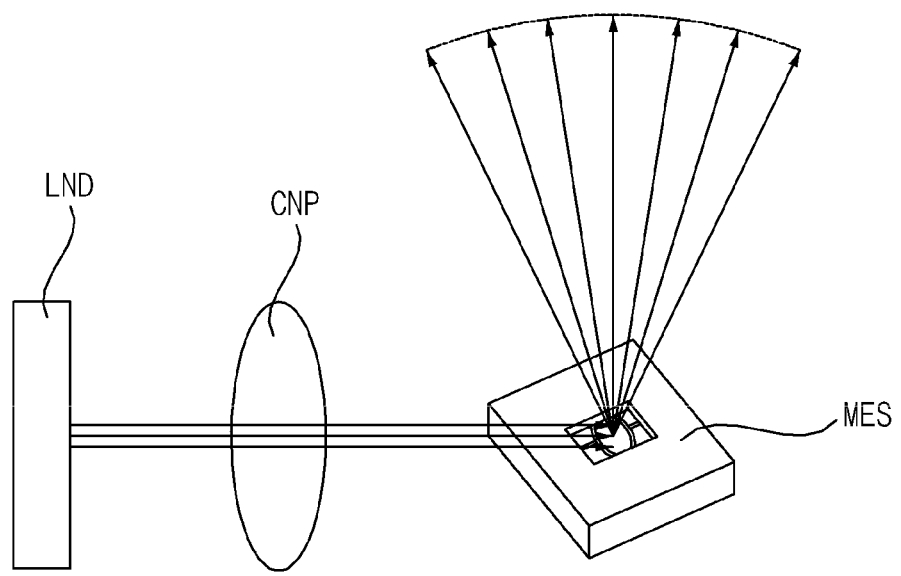

FIG. 15A shows an example of a light source 210Pa including a condensing lens MP and a uniaxial MEMS scanner MES.

Such a light source 210Pa may be used as a light source using the above-mentioned TOF method.

Figure 15B:
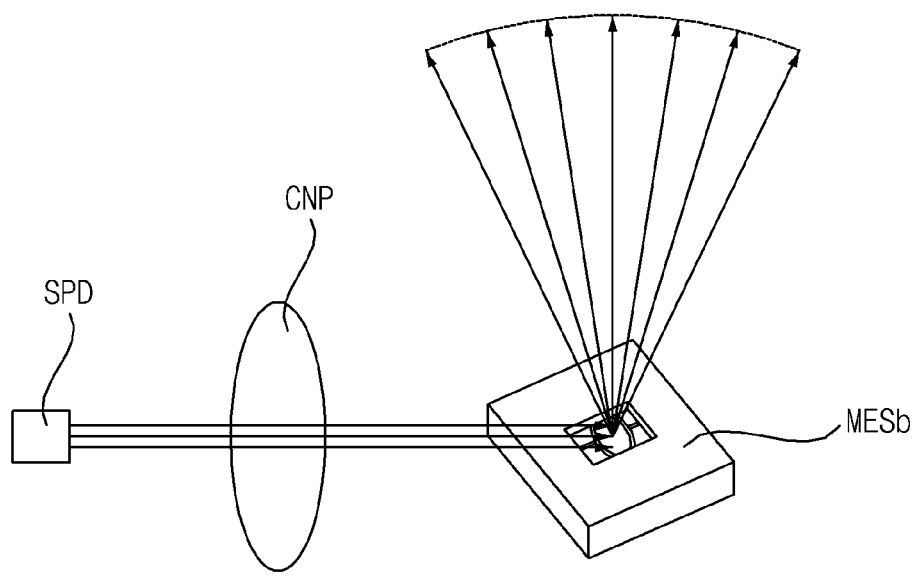

FIG. 15B shows an example of a light source 210Pa including a point light source SPD, a condensing lens CMP, and a biaxial MEMS scanner MESb.

Figure 16A:
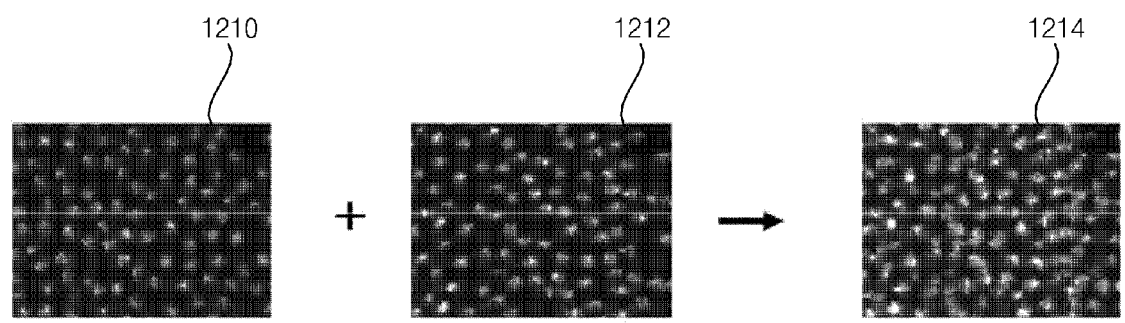

FIG. 16A is a view referenced to describe how noise is attenuated by a light source based on an image signal input into the processor 270.

The first image 1210 may be an image obtained when the output direction of the light source is not varied, and the second image 1212 may be an image obtained when the output direction of the light source is varied.

The processor 270 may combine the first image 1210 and the second image 1212 to generate a third image 1214 from which noise is removed and whose pattern resolution is increased.

Alternatively, unlike the above description, the first image 1210 may be an image obtained by varying a first output direction of the light source at a first point in time, and the second image 1212 may be an image obtained by varying a second output direction of the light source at a second point in time.

In addition, the processor 270 may combine the first image 1210 and the second image 1212 to generate a third image 1214 from which noise is removed and whose pattern resolution is increased.

Figure 16B:
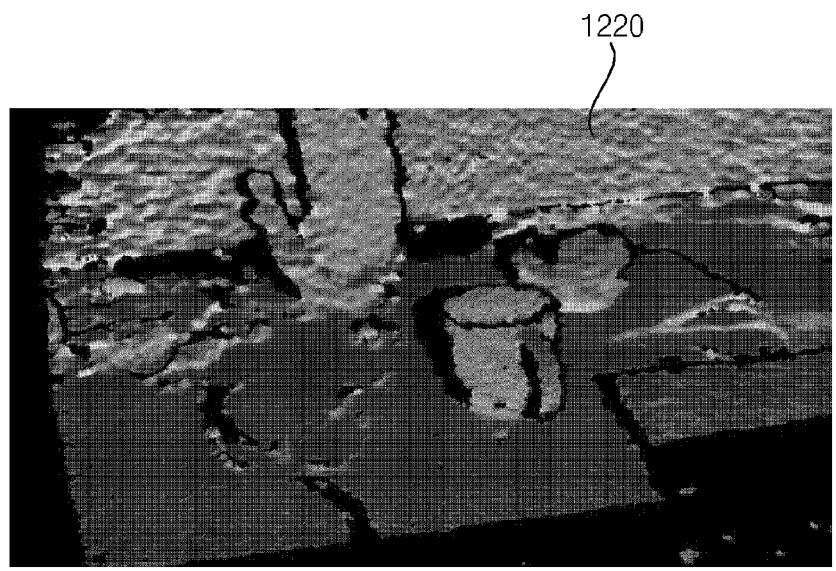
Figure 16B:
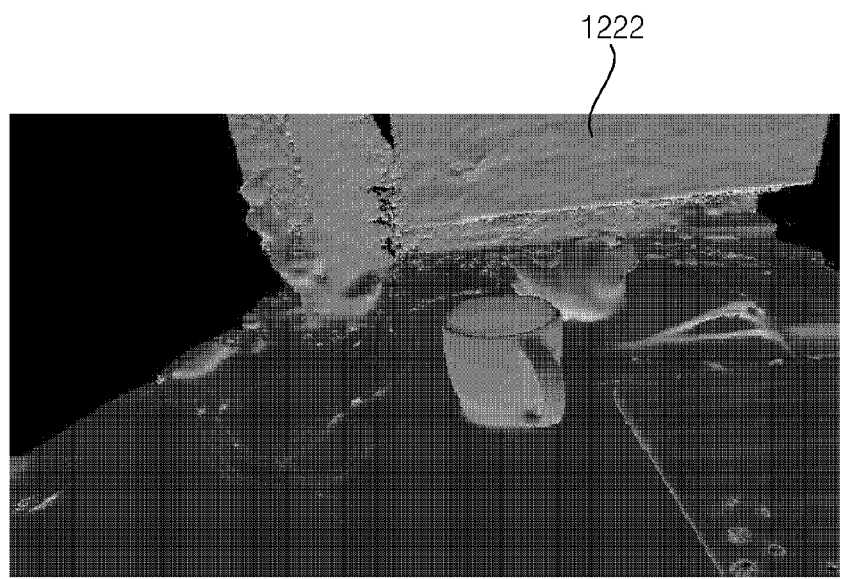

The first image 1220 of FIG. 16B exemplifies an image generated by the processor 270 when the output direction of the light source is not varied, and the second image 1222 of FIG. 16B exemplifies an image generated by the processor 270 when the output direction of the light source is varied.

Based upon a comparison between the first image 1220 and the second image 1222, it can be seen that variation of the output direction of the light source improved the images.

Figure 16C:
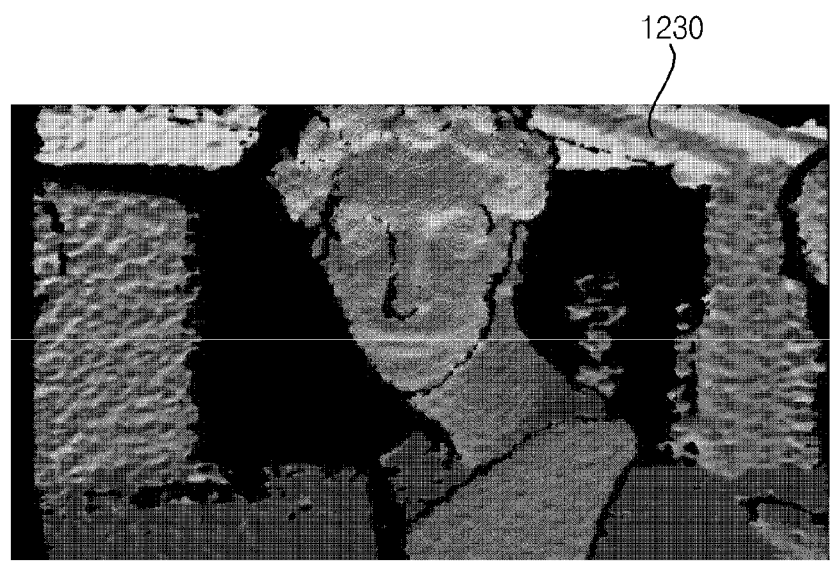
Figure 16C:

The first image 1230 of FIG. 16C exemplifies an image generated by the processor 270 when the output direction of the light source is not varied, and the second image 1232 of FIG. 16C exemplifies an image generated by the processor 270 when the output direction of the light source is varied.

Based upon a comparison between the first image 1230 and the second image 1232, it can be seen that variation of the output direction of the light source improved the images.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The present disclosure is applicable to a camera apparatus and an electronic device having the same.

What is claimed is:

1. A camera apparatus comprising:
   a light source;
   a first lens module configured to output light from the light source to an outside;
   an actuator configured to move the light source or the first lens module; and
   an image sensor configured to convert external light into an electrical signal,
   wherein the actuator is configured to move the light source and the image sensor.

2. The camera apparatus of claim 1, wherein the first lens module includes:
   a plurality of lenses positioned above the light source; and
   a frame configured to support the plurality of lenses,
   wherein the actuator includes a coil attached to the frame and a magnet spaced apart from the coil.

3. The camera apparatus of claim 2, wherein the actuator is disposed on a side surface of the frame and changes an output direction of light from the light source by performing horizontal rotation or vertical rotation of the first lens module.

4. The camera apparatus of claim 1, wherein the first lens module includes:
   a plurality of lenses positioned above the light source; and
   a frame configured to support the plurality of lenses,
   wherein the actuator includes a liquid lens disposed on or above the plurality of lenses.

5. The camera apparatus of claim 4, wherein the actuator changes an output direction of light from the light source by varying a curvature of the liquid lens.

6. The camera apparatus of claim 1, wherein the actuator is configured to change a direction of travel of the output light based on a movement pattern.

7. The camera apparatus of claim 1, further comprising a second lens module configured to collect light from the outside and deliver the collected light to the image sensor.

8. The camera apparatus of claim 7, further comprising a third lens module spaced apart from the second lens module, the third lens module being configured to collect light from the outside and deliver the collected light to the image sensor.

9. The camera apparatus of claim 1, wherein the actuator changes a direction of travel of the light output from the first lens module and a direction of travel of light input into the image sensor.

10. The camera apparatus of claim 9, wherein the actuator includes a liquid lens disposed on or above the first lens module and above the image sensor.

11. The camera apparatus of claim 1, further comprising a processor configured to control the actuator.

12. The camera apparatus of claim 1, further comprising a processor configured to control the actuator,
    wherein the processor is configured to receive motion information from an external inertial sensor, and control the actuator to operate based on a level of the motion information being lower than a reference value and control the actuator to not operate based on the level of the motion information being higher than or equal to the reference value.

13. The camera apparatus of claim 1, wherein the processor is configured to generate a three-dimensional (3D) image based on a plurality of image frames obtained by conversion by the image sensor, based on light of output direction changed by the actuator.

14. A camera apparatus comprising:
    a light source;
    a first lens module configured to output light from the light source to an outside;
    a second lens module configured to collect light from the outside;
    an image sensor configured to convert light coming from the second lens module into an electrical signal;
    an actuator configured to move direction of travel of light output from the first lens module and a direction of travel of light input into the second lens module; and
    a processor configured to control the actuator,
    wherein the processor is configured to receive motion information from an external inertial sensor, and control the actuator to operate based on a level of the motion information being lower than a reference value and control the actuator to not operate based on the level of the motion information being higher than or equal to the reference value.

15. The camera apparatus of claim 14, wherein the actuator includes a liquid lens disposed on or above the first lens module and the second lens module.

16. The camera apparatus of claim 14, wherein the processor is further configured to generate a three-dimensional (3D) image based on a plurality of image frames obtained by conversion by the image sensor, based on the light of the output direction changed by the actuator.

17. An electronic device comprising:
    a camera apparatus,
    wherein the camera apparatus comprises:
      a light source;
      a lens module configured to output light from the light source to the outside;
      an actuator configured to move the light source or the lens module; and
      an image sensor configured to convert external light into an electrical signal,
      wherein the actuator is configured to move the light source and the image sensor.

* * * * *